US009326285B2

(12) United States Patent
Choi et al.

(10) Patent No.: US 9,326,285 B2
(45) Date of Patent: Apr. 26, 2016

(54) METHOD FOR SETTING SERVICE PERIOD IN WIRELESS COMMUNICATION SYSTEM AND APPARATUS FOR SAME

(71) Applicant: LG ELECTRONICS, INC., Seoul (KR)

(72) Inventors: Jinsoo Choi, Anyang-si (KR); Seunghee Han, Anyang-si (KR); Jinsam Kwak, Anyang-si (KR); Yongho Seok, Anyang-si (KR); Jeongki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/379,996

(22) PCT Filed: Feb. 28, 2013

(86) PCT No.: PCT/KR2013/001629

§ 371 (c)(1),
(2) Date: Aug. 20, 2014

(87) PCT Pub. No.: WO2013/129861

PCT Pub. Date: Sep. 6, 2013

(65) Prior Publication Data

US 2015/0063233 A1 Mar. 5, 2015

Related U.S. Application Data

(60) Provisional application No. 61/605,695, filed on Mar. 1, 2012, provisional application No. 61/604,446, filed on Feb. 28, 2012.

(51) Int. Cl.
*H04W 72/04* (2009.01)
*H04W 52/02* (2009.01)
*H04W 88/08* (2009.01)
*H04W 74/00* (2009.01)

(Continued)

(52) U.S. Cl.
CPC ...... *H04W 72/0446* (2013.01); *H04W 52/0216* (2013.01); *H04W 74/002* (2013.01); *H04W 88/08* (2013.01); *H04W 74/06* (2013.01); *H04W 84/12* (2013.01)

(58) Field of Classification Search
CPC .......... H04W 72/0446; H04W 74/002; H04W 88/08; H04W 52/0216; H04W 74/06; H04W 84/12
See application file for complete search history.

(56) References Cited

U.S. PATENT DOCUMENTS 7,668,128 B1 * 2/2010 Benveniste ............ H04W 28/18
370/252
8,526,346 B1 * 9/2013 Liu .................... H04W 52/0229
370/311

(Continued)

FOREIGN PATENT DOCUMENTS

KR  10-2005-0107427 A  11/2005
KR  10-2007-0033287 A   3/2007

(Continued)

*Primary Examiner* — Mohammad Anwar
(74) *Attorney, Agent, or Firm* — Dentons US LLP

(57) ABSTRACT

Disclosed is a method for setting a service period (SP) of a station (STA) in a wireless communication system and an apparatus for supporting the method. More particularly, the method comprises a step of transmitting a trigger frame to an access point (AP) and starting the service period. The trigger frame may be a data frame that includes data to be transmitted to the AP or a null frame for triggering the data transmission of the AP.

7 Claims, 54 Drawing Sheets

(51) Int. Cl.
*H04W 84/12* (2009.01)
*H04W 74/06* (2009.01)

(56) References Cited

U.S. PATENT DOCUMENTS

2005/0135302 A1* 6/2005 Wang ................ H04W 52/0216
370/329

2007/0281617 A1* 12/2007 Meylan ................ H04W 16/14
455/41.2

FOREIGN PATENT DOCUMENTS

| KR | 100914319 B1 | 8/2009 |
|---|---|---|
| KR | 10-2009-0132592 A | 12/2009 |
| KR | 1020110067937 A | 6/2011 |
| KR | 1020110070794 A | 6/2011 |

* cited by examiner

FIG. 13
(a) 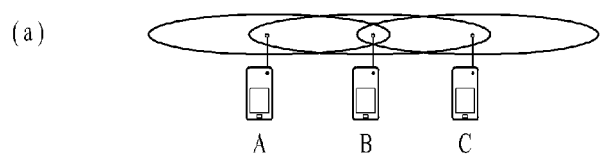
(b) 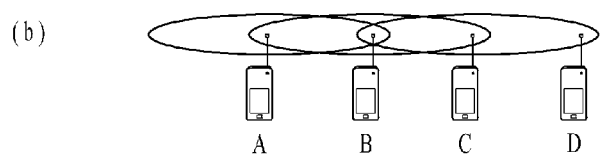

D1 = aRxRFDelay + aRxPLCPDelay (referenced from the end of the last symbol of a frame on the medium)
D2 = D1 + Air Propagation Time
Rx/Tx = aRXTXTurnaroundTime (begins with a PHYTXSTART.request)
M1 = M2 = aMACProcessingDelay
CCAdel = aCCA Time - D1

FIG. 20

| Element ID | Length | DTIM Count | DTIM Period | Bitmap Control | Partial Virtual Bitmap |
|---|---|---|---|---|---|

Octets :   1   1   1   1   1   1-251

FIG. 21

| Element ID | Length | TSF 0 Offset | Interval/ Duration | Optional Subelements |
|---|---|---|---|---|
| 1 | 1 | 8 | 4 | variable |

Octets :

FIG. 22
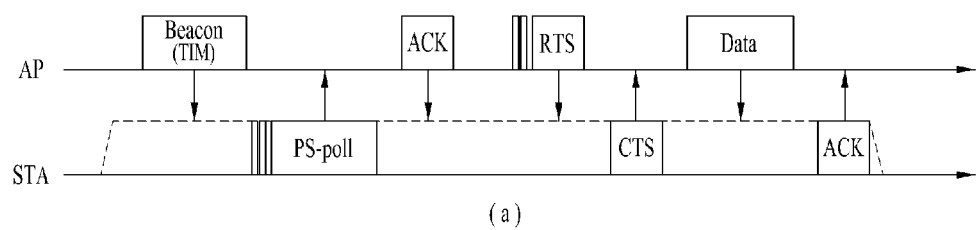
(a)
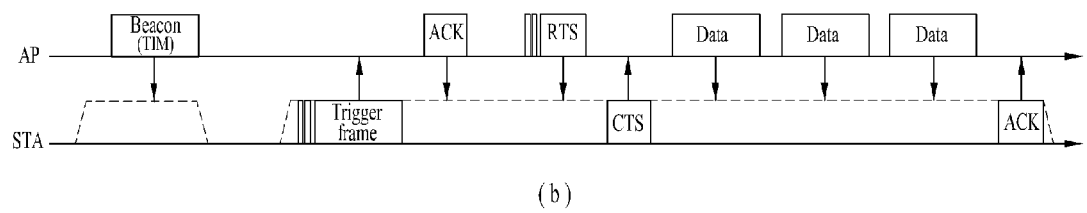
(b)

FIG. 24

| Element ID | Length | reserved | Service period |
|---|---|---|---|

Octets :   1   1   1 (omissible)   2

| Element ID | Length | reserved | APSD DL size limitation (2bits) + Allowed AC (4bits) + reserved (2bits) |
|---|---|---|---|

Octets :     1     1     1 (omissible)     1

(b)

| Element ID | Length | reserved | APSD DL size limitation (2bits) + Full TID (4bits) + reserved (2bits) |
|---|---|---|---|

Octets :     1     1     1 (omissible)     1

(c)

| Element ID | Length | reserved | APSD DL size limitation (2bits) + 1bit flag + Full TID (4bits) or allowed AC (4bits)+ reserved (1bit) |
|---|---|---|---|

Octets :     1     1     1 (omissible)     1

METHOD FOR SETTING SERVICE PERIOD IN WIRELESS COMMUNICATION SYSTEM AND APPARATUS FOR SAME This application is a National Stage Entry of International Application No. PCT/KR2012/001629 filed Feb. 28, 2013, which claims priority to U.S. Provisional Application Nos. 61/604,446 filed Feb. 28, 2012 and 61/605,695 filed Mar. 1, 2012, all of of which are incorporated herein by reference.

TECHNICAL FIELD

The present invention relates to a wireless communication system, and more particularly, to a method of setting a service period in a wireless LAN system and apparatus therefor.

BACKGROUND ART

Recently, with the help of development of technologies of information and communication, various wireless communication technologies are developing. Among the various wireless communication technologies, a wireless LAN (WLAN) is a technology enabling such a portable terminal as a personal digital assistant (PDA), a laptop computer, a portable multimedia player (PMP) and the like to access the internet in wireless in home, enterprise or an area to which a specific service is provided based on a wireless frequency technology.

In order to overcome a limit for transmission speed, which has been pointed out as a weak point of the wireless LAN, a latest technological standard introduced a system of which network speed and reliability are increased and a management distance of a wireless network is enlarged. For instance, IEEE 802.11n supports high throughput where data processing speed is greater than maximum 540 Mbps. Moreover, in order to minimize a transmission error and optimize data speed, a MIMO (multiple inputs and multiple outputs) technology using multiple antennas in both a transmitting end and a receiving end is introduced.

DISCLOSURE OF THE INVENTION

Technical Tasks

One object of the present invention is to provide a method of setting an enhanced service period in a wireless communication system, preferably, a wireless LAN system and an apparatus therefor.

Another object of the present invention is to provide a method of preventing an STA from consuming unnecessary power in case of setting a service period and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of setting an SP (service period) of an STA (station) in a wireless communication system include the steps of transmitting a trigger frame to an AP (access point) and starting the service period, wherein the trigger frame corresponds to a data frame including data to be transmitted to the AP or a null frame triggering data transmission of the AP.

Preferably, the trigger frame includes a frame type field and the frame type field can indicate whether the trigger frame corresponds to the data frame or the null frame.

Preferably, the data frame can include an access category field indicating at least one access category capable of being delivered or triggered by the STA.

In this case, the access category can include a background category, a best effort category, a video category and a voice category. The access category field is consists of bits as many as the number of categories consisting of the at least one access category and can indicate whether it is possible to deliver or whether it is possible to trigger according to each category consisting of the access category via each of the bits.

Preferably, the null frame can include a maximum service period length field. In this case, the maximum service period length field can indicate the maximum number of a data unit to be received from the AP by the STA during the service period.

The service period may end when the maximum number of the data unit determined by information of the maximum service period length is received.

Advantageous Effects

According to embodiment of the present invention, a method of setting an enhanced service period in a wireless communication system, preferably, a wireless LAN system and an apparatus therefor can be provided.

And, according to embodiment of the present invention, since unnecessary overhead of a trigger frame for a service period can be reduced, power of an STA can be saved.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 13 is a diagram for explaining a hidden node and an exposed node;

FIG. 20 is a diagram for an example of a TIM element format;

FIG. 21 is a diagram for an example of a U-APSD coexistence element format;

FIG. 22 is a diagram for explaining an operation of an STA according to a PS-poll mechanism and a U-APSD mechanism;

FIG. 24 is a diagram for an example of an information element including service period information;

FIG. 25 is a diagram for an example of an information element in various forms including information on APSD downlink delivery;

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

Specific terminologies used in the following description are provided to help understand the present invention and the use of the specific terminologies can be modified into a different form in a range of not deviating from the technical idea of the present invention.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/

GPRS/EDGE (Global System for Mobile communications)/ General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

For clarity, the present invention mainly concerns IEEE 802.11 system, by which the technical characteristic of the present invention may be non-limited.

The General of System

Figure 1:
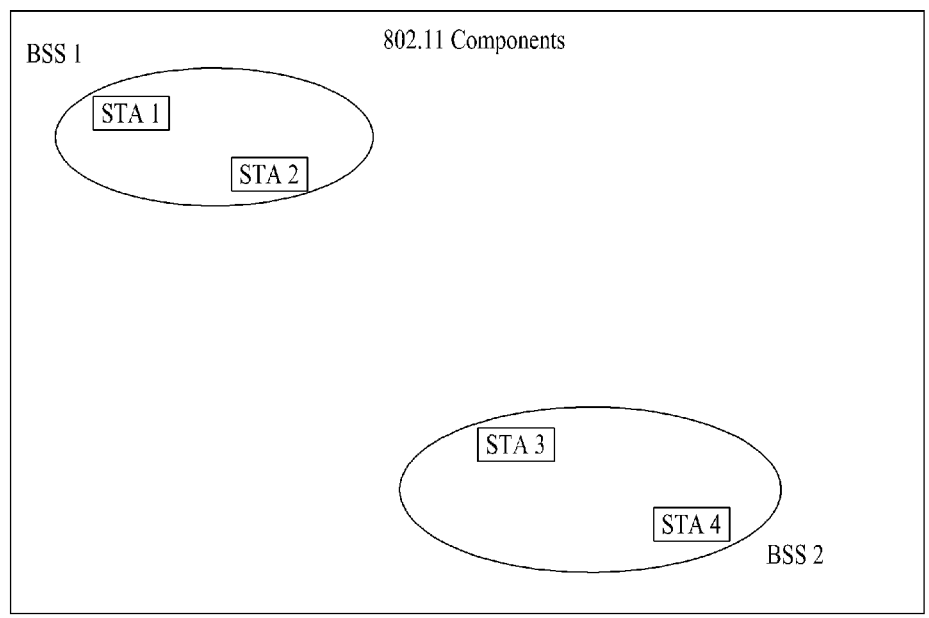
FIG. 1 is a diagram for an example of a structure of IEEE 802.11 system to which the present invention is applicable.

FIG. 1 is a diagram for an example of a structure of IEEE 802.11 system to which the present invention is applicable.

IEEE 802.11 structure can consist of a plurality of configuration elements and a WLAN supporting mobility of an STA, which is transparent to an upper layer, can be provided by interaction of a plurality of the configuration elements. A basic service set (hereinafter abbreviated BSS) may correspond to a basic configuration block in IEEE 802.11 LAN. FIG. 1 depicts an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). An oval indicating a BSS in FIG. 1 may be comprehended as a coverage area of the STAs included in the BSS to maintain a communication. This area can be called a basic service area (hereinafter abbreviated BSA). If an STA moves out of the BSA, the STA cannot directly communicate with different STAs within the BSA.

A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN can be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS can be dynamically changed. In order to be a member of the BSS, the STA can join the BSS using a synchronization process. In order to access all services based on a BSS structure, the STA should be associated with the BSS. The association can be dynamically set and may include a use of a distribution system service (hereinafter abbreviated DSS).

Figure 2:
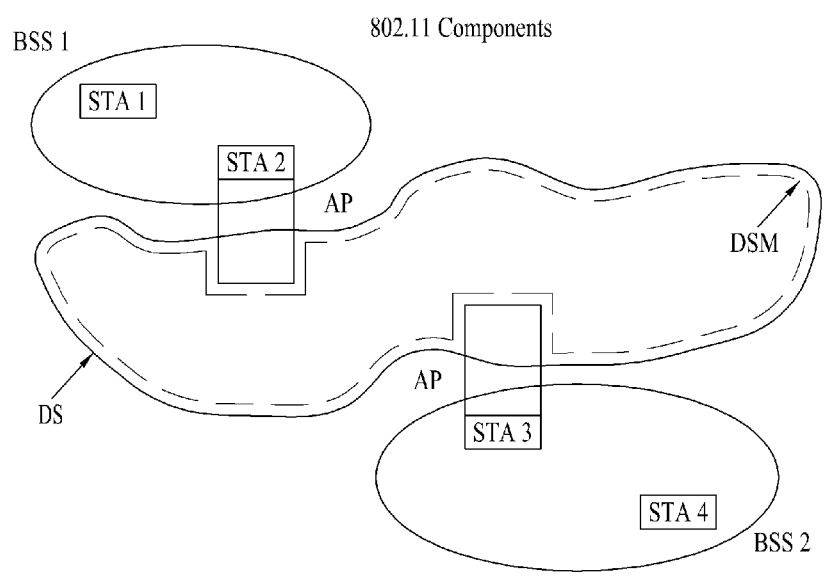
FIG. 2 is a diagram for a different example of a structure of IEEE 802.11 system to which the present invention is applicable.

FIG. 2 is a diagram for a different example of a structure of IEEE 802.11 system to which the present invention is applicable. FIG. 2 is a form to which such a configuration element as a distribution system (DS), a distribution system medium (DMS), an access point (AP), and the like is added to the structure of FIG. 1.

In a LAN, a direct distance between stations can be restricted by PHY performance. In some cases, the distance may be sufficient to perform a communication. Yet, in some cases, it may be necessary to perform a communication of a longer distance between stations. The distribution system (DS) can be configured to support an extended coverage.

The DS means a structure that BSSs are connected with each other. Specifically, instead of independently existing as depicted in FIG. 1, a BSS may exist as a configuration element of an extended form of a network consisting of a plurality of BSSs.

The DS is a logical concept and can be characterized by an attribute of the distribution system medium (DSM). Regarding this, IEEE 802.11 standard logically distinguishes a wireless medium (WM) from the distribution system medium (DSM). Each of the logical media is used for purposes different from each other and is used by configuration elements different from each other. According to the definition of IEEE 802.11 standard, the media may be limited to neither an identical medium nor media different from each other. Flexibility of the IEEE 802.11 LAN structure can be explained in that pluralities of the media are logically different from each other. In particular, IEEE 802.11 LAN structure can be variously implemented. The corresponding LAN structure can be independently characterized by a physical attribute of each implementation example.

The DS can support a mobile device in a manner of providing the mobile device with a seamless integration of a plurality of BSSs and logical services necessary for controlling an address to a destination.

The AP enables related STAs to access the DS via the WM and means an entity having STA functionality. Data can move between the BSS and the DS via the AP. For instance, an STA 2 and an STA 3 depicted in FIG. 2 have STA functionality and provide a function of enabling the related STAs (an STA 1 and an STA 4) to access the DS. And, since all APs basically correspond to an STA, all APs are entities capable of being addressed. An address used by the AP for a communication in the WM may not be identical to an address used by the AP for a communication in the DS.

A data transmitted to an STA address of an AP from one of STAs related to the AP is always received in an uncontrolled port and can be processed by IEEE 802.1X port entity. And, if a controlled port is authenticated, a transmission data (or a frame) can be delivered to the DS.

Figure 3:
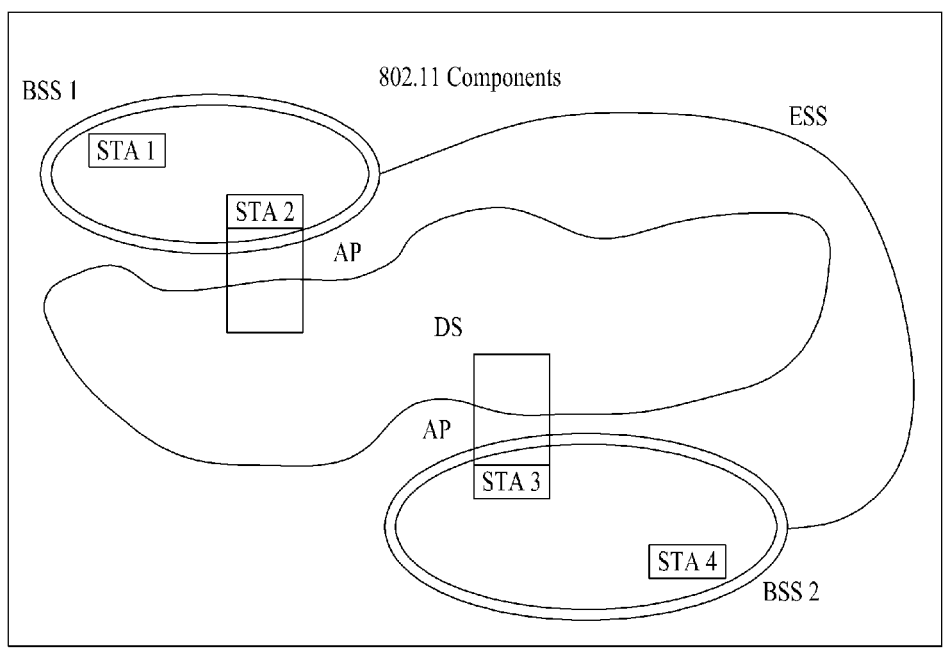
FIG. 3 is a diagram for a further different example of a structure of IEEE 802.11 system to which the present invention is applicable.

FIG. 3 is a diagram for a further different example of a structure of IEEE 802.11 system to which the present invention is applicable. FIG. 3 conceptually shows an extended service set (hereinafter abbreviated ESS) configured to provide a wider coverage in addition to the structure of FIG. 2.

A wireless network of an arbitrary size and complexity may consist of a DS and BSSs. This kind of network is called an ESS network in IEEE 802.11 system. The ESS may correspond to a set of BSSs connected with a single DS. Yet, the ESS does not include the DS. The ESS network is seen as an IBSS network in a LLC (logical link control) layer. STAs included in the ESS can communicate with each other and moving STAs can move from one BSS to another BSS (within an identical ESS) in a manner of being transparent to the LLC.

According to IEEE 802.11, nothing is assumed for a physical location of the BSSs depicted in FIG. 3. Forms described in the following are all available in IEEE 802.11. The BSSs can be partly overlapped with each other. This is a form generally used to provide a contiguous coverage. And, the BSSs may not be physically connected with each other and there is no limit for a logical distance between the BSSs. The BSSs can be physically positioned at an identical location. This can be used to provide a redundancy. And, one (or more) IBSS or ESS networks can physically exist in an identical space as one (or more) ESS network. This may correspond to a form of the ESS network in case that an ad-hoc network operates in the location at which the ESS network exists, physically duplicated IEEE 802.11 networks are configured by different organizations, two or more different access and security policies are required in an identical location, and the like.

Figure 4:
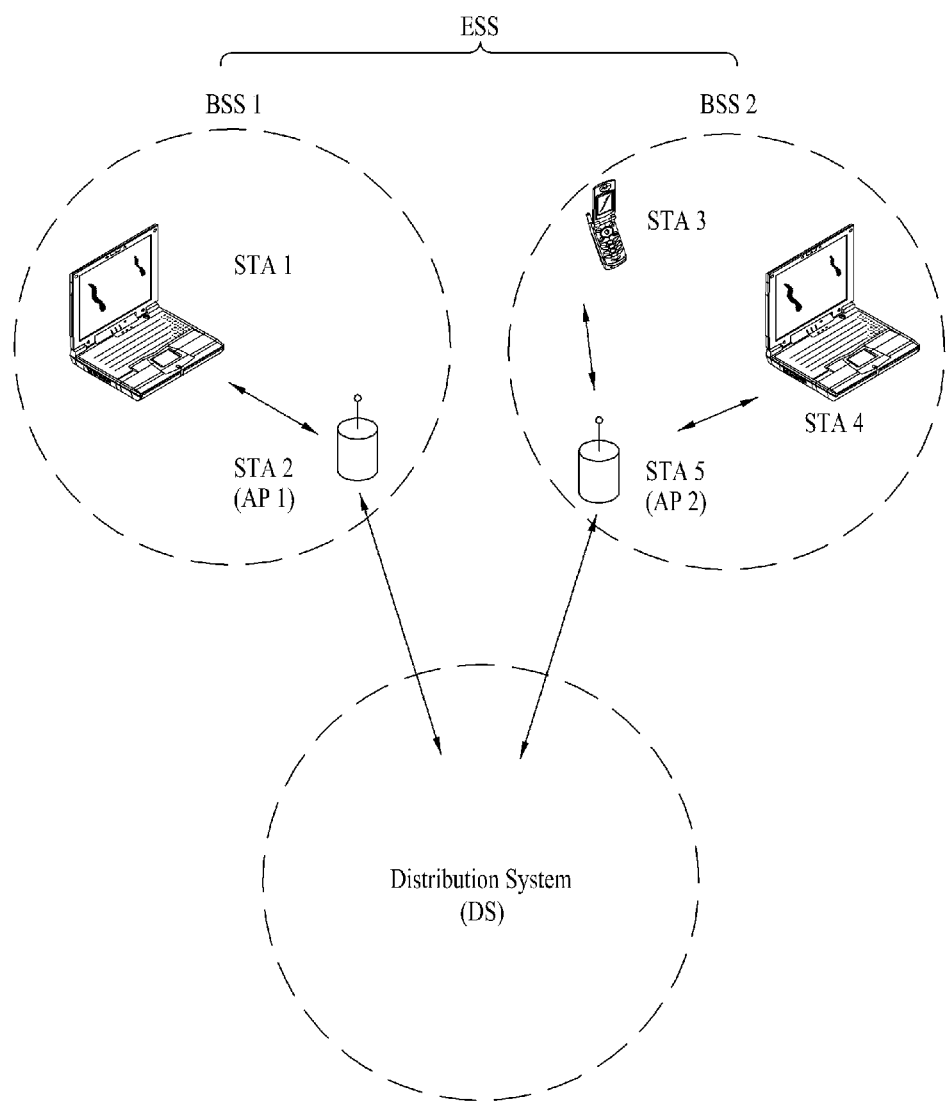
FIG. 4 is a diagram for an example of a structure of WLAN system.

FIG. 4 is a diagram for an example of a structure of WLAN system. FIG. 4 shows an example of an infrastructure BSS including a DS.

According to the example of FIG. 4, an ESS consists of a BSS 1 and a BSS 2. In a WLAN system, an STA corresponds to a device operating in accordance with a MAC/PHY regulation of IEEE 802.11. The STA includes an AP STA and a non-AP STA. The non-AP STA corresponds to a device directly controlled by a user such as a laptop computer and a cellular phone. In the example of FIG. 4, an STA 1, an STA 3, and an STA 4 correspond to the non-AP STA and an STA 2 and an STA 5 correspond to the AP STA.

In the following description, the non-AP STA may be called a terminal, a wireless transmit/receive unit (WTRU), a user equipment (UE), a mobile station (MS), a mobile terminal (MT), a mobile subscriber station (MSS), and the like. And, the AP is a concept corresponding to a base station (BS), a nodeB, an evolved Node B (eNB), a base transceiver system (BTS), a femto base station (femto BS), and the like in a different wireless communication field.

Figure 5:
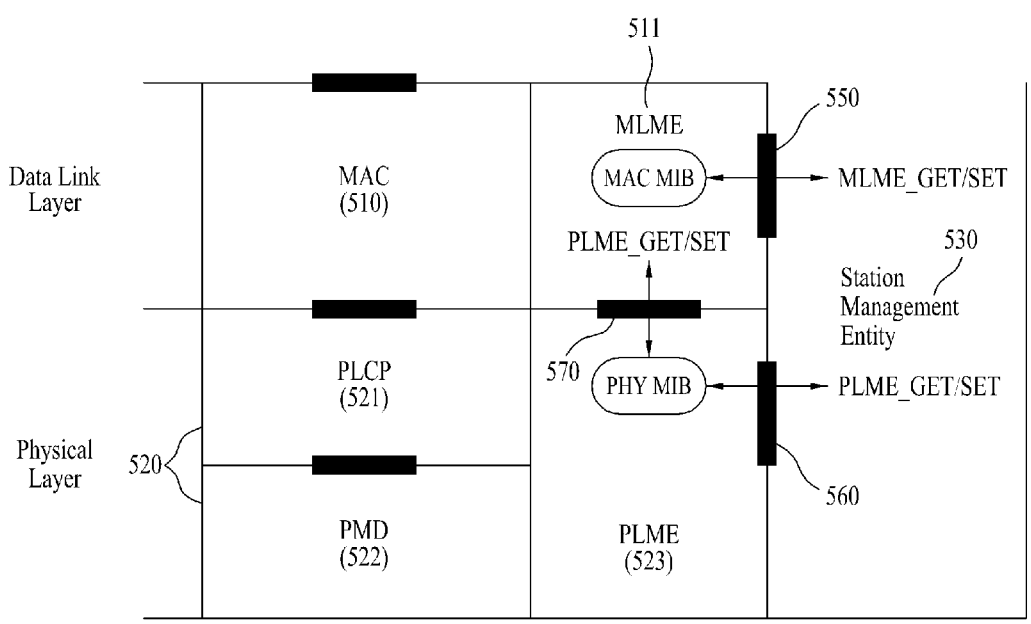
FIG. 5 is a diagram for an example of a data link layer structure and a physical layer structure of IEEE 802.11 system to which the present invention is applicable.

FIG. 5 is a diagram for an example of a data link layer structure and a physical layer structure of IEEE 802.11 system to which the present invention is applicable.

Referring to FIG. 5, a physical layer 520 can include a PLCP (physical layer convergence procedure) entity 521 and a PMD (physical medium dependent) entity 522. The PLCP entity 21 plays a role of connecting a MAC sub-layer 510 with a data frame. The PMD entity 522 plays a role of transceiving data with two or more STAs in wireless using an OFDM scheme.

Both the MAC sub-layer 510 and the physical layer 520 can include a conceptual management entity. The conceptual management entity of the MAC sub-layer and the conceptual management entity of the physical layer are called a MLME (MAC sub-layer management entity) 511 and a PLME (physical layer management entity) 523, respectively. These entities 51/521 provide a layer management service interface via an operation of a layer management function.

In order to provide a precise MAC operation, there may exist an SME (station management entity) 530 in each STA. The SME 530 is a management entity independent of each layer. The SME collects layer based state information from a plurality of layer management entities or configures a value of specific parameters of each layer. The SME 530 can perform the aforementioned function instead of general system management entities and can implement a standard management protocol.

The aforementioned various entities can interact with each other using various methods. FIG. 5 shows an example of exchanging a GET/SET primitive with each other. An XX-GET.request primitive is used for requesting a value of an MIB (management information base) attribute. If a state corresponds to 'SUCCESS', an XX-GET.confirm primitive returns the MIB attribute value. Otherwise, the XX-GET.confirm primitive returns in a manner of displaying an error sign in a state field. An XX-SET.request primitive is used to make a request for setting a designated MIB attribute with a given value. If the MIB attribute means as a specific operation, the request makes a request for an execution of the specific operation. And, if a state corresponds to 'SUCCESS', an XX-SET.confirm primitive means that the designated MIB attribute is set with the requested value. Other cases except the aforementioned cases indicate an error situation. If the MIB attribute means a specific operation, this primitive can confirm that the operation is performed.

As shown in FIG. 5, the MLME 511 and the SME 530 can exchange various primitives with each other via an MLME_SAP (MLME_service access point) 550. And, the PLME 523 and the SME 530 can exchange various primitives with each other via a PLME_SAP (PLME_service access point) 560. And, a primitive can be exchanged with each other between the MLME 511 and the PLME 523 via an MLME-PLME_SAP (MLME-PLMEservice access point) 570.

Link Setup Process

Figure 6:
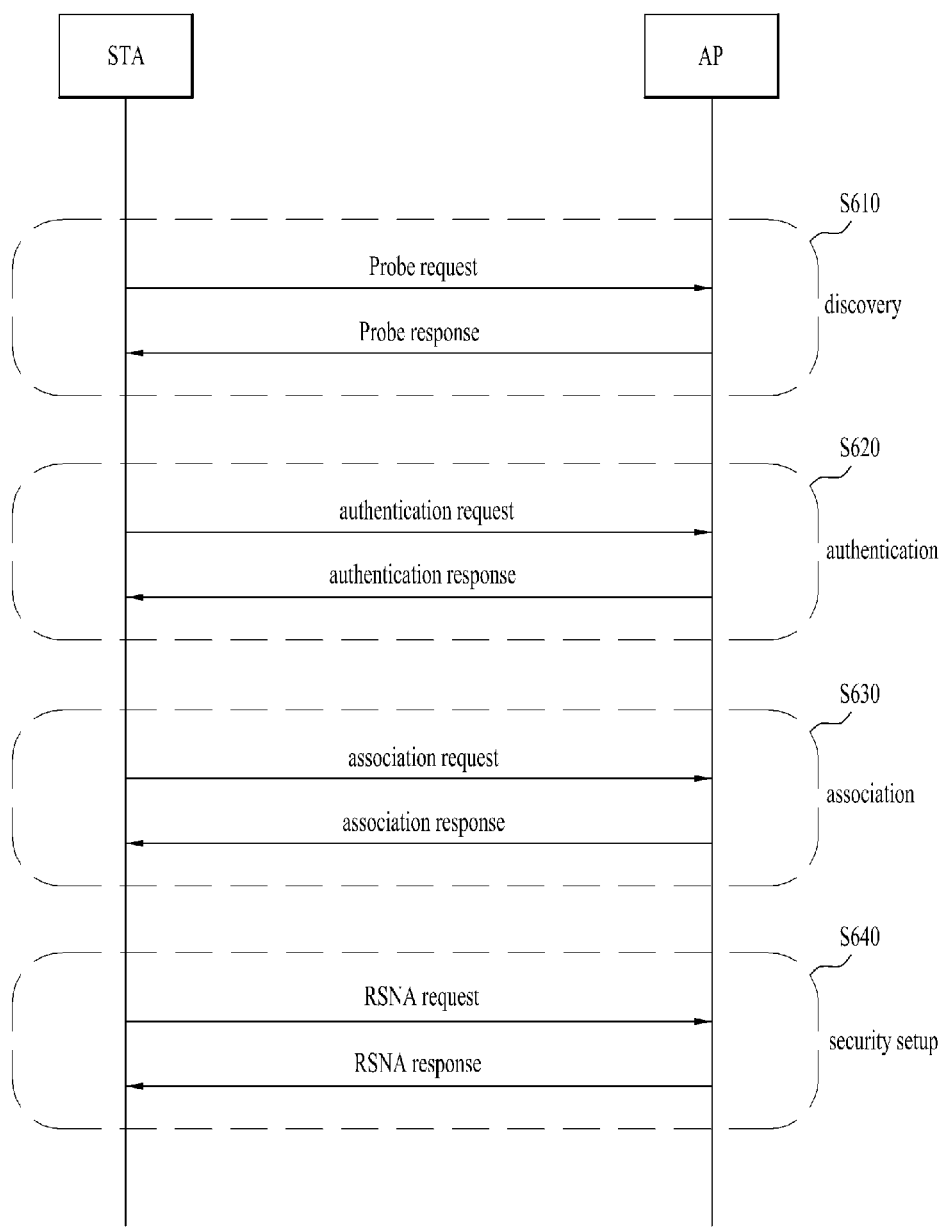
FIG. 6 is a flowchart for explaining a general link setup process in a wireless LAN system to which the present invention is applicable.

FIG. 6 is a flowchart for explaining a general link setup process in a wireless LAN system to which the present invention is applicable.

In order for an STA to setup a link with a network and transceive data with the network, first of all, the STA should discover the network, perform authentication, establish association and undergo an authentication procedure for security. A link setup process may also be called a session initiation process or a session setup process. And, the processes of the link setup process including the discovery, the authentication, the association and the security configuration can be commonly called the association process.

An example of the link setup process is explained in the following with reference to FIG. 6.

In the step S610, an STA can perform a network discovery operation. The network discovery operation can include a scanning operation of the STA. In particular, in order for the STA to access a network, the STA should find out a network in which the STA is able to participate. Before the STA participates in a wireless network, the STA should identify a compatible network. A process of identifying a network existing at a specific area is called a scanning.

A scanning scheme can be classified into an active scanning and a passive scanning.

For instance, FIG. 6 shows a network discovery operation including an active scanning process. In case of performing an active scanning, in order for an STA performing the scanning to search for APs existing in the vicinity of the STA, the STA transmits a probe request frame while moving around channels and waits for a response in response to the probe request frame. A responder transmits a probe response frame to the STA, which have transmitted the probe request frame, in response to the probe request frame. In this case, the responder may correspond to an STA, which have lastly transmitted a beacon frame in a BSS of a channel currently being scanned. Since an AP transmits a beacon frame in the BSS, the AP becomes a responder. On the contrary, in an IBSS, since STAs in the IBSS transmit a beacon frame in turn, a responder varies. For instance, if an STA transmits a probe request frame on a #1 channel and receives a probe response frame on the #1 channel, the STA stores BSS-related information included in the received probe response frame, moves to a next channel (e.g., a #2 channel) and may be then able to perform a scanning (i.e., transmitting/receiving a probe request/response) using an identical method.

Although it is not depicted in FIG. 6, a scanning operation can be performed by a passive scanning scheme. An STA performing a scanning in the passive scanning waits for a beacon frame while moving around channels. The beacon frame is one of management frames in IEEE 802.11. The beacon frame is periodically transmitted to notify existence of a wireless network, make the STA performing the scanning find out the wireless network and participate in the wireless network. An AP plays a role of periodically transmitting the beacon frame in the BSS and STAs in the IBSS transmit the beacon frame in turn in the IBSS. If the STA performing the scanning receives the beacon frame, the STA stores information on the BSS included in the beacon frame and records beacon frame information in each channel while moving to a different channel. Having received the beacon frame, the STA stores BSS-related information included in the received beacon frame, moves to a next channel and can perform scanning using an identical method in the next channel.

When comparing the active scanning with the passive scanning, the active scanning is superior to the passive scanning in terms of a low delay and a less power consumption.

In the step S620, an authentication process can be performed after a network is discovered by the STA. In order to clearly distinguish the authentication process from a security setup operation described in the following in the step S640, the authentication process can be called a first authentication process.

The authentication process includes a process that the STA transmits an authentication request frame to the AP and the AP transmits an authentication response frame to the STA in response to the authentication request frame. An authentication frame used for the authentication request/response corresponds to a management frame.

The authentication frame can include information on an authentication algorithm number, an authentication transaction sequence number, a status code, a challenge text, an RSN (robust security network), a finite cyclic group and the like. The above-mentioned corresponds to a part of examples of information capable of being included in the authentication request/response frame only. The above-mentioned information can be replaced with different information or additional information can be further included as well.

The STA can transmit the authentication request frame to the AP. The AP can determine whether to permit authentication for the STA based on information included in the received authentication request frame. The AP can provide a result of authentication process to the STA via the authentication response frame.

After the STA is successfully authenticated, an association process can be performed in the step S630. The association process can include a process that the STA transmits an association request frame to the AP and the AP transmits an association response frame to the STA in response to the association request frame.

For instance, the association request frame can include information on various capabilities, information on beacon listening interval, an SSID (service set identifier), supported rates, supported channels, an RSN, a mobility domain, supported operating classes, a TIM (traffic indication map) broadcast request, an interworking service capability and the like.

For instance, the association response frame can include information on various capabilities, information on a status code, an AID (association ID), supported rates, an EDC (enhanced distributed channel access) parameter set, an RCPI (received channel power indicator), an RSNI (received signal to noise indicator), a mobility domain, a timeout interval (association comeback time), an overlapping BSS scan parameter, a TIM broadcast response, a QoS (quality of service) map and the like.

The above-mentioned corresponds to a part of examples of information capable of being included in the association request/response frame only. The above-mentioned information can be replaced with different information or additional information can be further included as well.

After the STA is successfully associated with the network, a security setup process can be performed in the step S640. The security setup process in the step S640 may be called an authentication process via an RSNA (robust security network association) request/response. Or, the authentication process in the step S620 is called a first authentication process and the security setup process in the step S640 can be simply called an authentication process.

For instance, the security setup process in the step S640 may include a process of performing a private key setup via four-way handshaking via an EAPOL (extensible authentication protocol over LAN) frame. And, the security setup process may be performed according to a security scheme not defined by IEEE 802.11 standard.

Evolution of WLAN

As a lately established technological standard to overcome a limit for transmission speed in a wireless LAN, there exist IEEE 802.11n. An object of IEEE 802.11n is to increase speed and reliability of a network and enlarge management distance of the wireless network. More specifically, IEEE 802.11n supports HT (high throughput) where data processing speed is greater than maximum 540 Mbps. And, IEEE 802.11n is based on MIMO (multiple inputs and multiple outputs) corresponding to a technology using multiple antennas in both a transmitting end and a receiving end to minimize a transmission error and optimize data speed.

As dissemination of a wireless LAN is vitalized and an application using the wireless LAN is diversified, a necessity for a new wireless LAN is coming to the fore to support a throughput higher than the data processing speed supported by IEEE 80.11n. A next generation wireless LAN system (e.g., IEEE 802.11ac) supporting a VHT (very high throughput) corresponds to a next version of the IEEE 802.11n wireless LAN system. The system is one of IEEE 802.11 wireless LAN systems newly proposed to support data processing speed faster than 1 Gbps in a MAC service access point (SAP).

In order to efficiently use a wireless channel, the next generation wireless LAN system supports transmission of an MU-MIMO (multi user multiple input multiple output) scheme of which a plurality of STAs access a channel at the same time. According to the MU-MIMO transmission scheme, an AP can transmit a packet to one or more MIMO-paired STAs at the same time. And, supporting a wireless LAN operation in a whitespace is under discussion. For instance, introduction of wireless LAN in such a TV whitespace (TV WS) as a frequency band (e.g., 54~698 MHz) of idle state, which is caused by digitalization of an analog TV, is discussed as IEEE 802.11af standard. Yet, this is just an example. The white space may correspond to a licensed band capable of being preferentially used by a licensed user. The licensed user indicates a user corresponding to a person that the use of the licensed band is granted. The licensed user can be called a licensed device, a primary user, am incumbent user or the like.

For instance, an AP and/or an STA operating in the WS should provide a protection function to the licensed user. For instance, if such a licensed user as a microphone already uses a specific WS channel, which is a divided frequency band according to a regulation to have a specific bandwidth in the WS band, the AP and/or the STA cannot use a frequency band corresponding to the WS channel to protect the licensed user. And, if the licensed user uses a frequency band, which is currently used for transmitting and/or receiving a frame, the AP and/or the STA should stop using the frequency band, Hence, the AP and/or the STA should preferentially perform a procedure for figuring out whether a specific frequency band is usable in the WS band, in other word, whether there is a licensed user in the frequency band. The procedure figuring out whether there is the licensed user in the specific frequency band is called spectrum sensing. As a spectrum sensing mechanism, an energy detection scheme, a signature detection scheme and the like can be utilized. If strength of a reception signal is greater than a prescribed value, it can be determined as the licensed user is using the signal. Or, if a DTV preamble is detected, it can be determined as the licensed user is using the signal.

And, as a next generation communication technology, an M2M (machine-to-machine) communication technology is under discussion. A technology standard to support M2M communication is developing as IEEE 802.11ah in the IEEE 802.11 wireless LAN system. The M2M communication indicates a communication scheme including one or more machines and can also be called an MTC (machine type communication) or an object communication. In this case, the machine indicates an entity not requiring a direct control or involvement of a human. For instance, examples of the machine may include such a personal device as a smartphone as well as such a device as a meter equipped with a wireless communication module or an auto-vending machine. The M2M communication can include a communication between devices (e.g., D2D (device-to-device communication)), a communication between a device and a server (application server) and the like. As an example of the communication between the device and the server, there are a communication between an auto-vending machine and a server, a communication between a POS (point of sale) device and a server, a communication between an electricity, gas or water supply meter and a server. Besides, an M2M communication based application may include security, transportation, healthcare and the like. According to a characteristic of the aforementioned applied example, it is necessary for the M2M communication to slowly transmit and receive a less amount of data from time to time in environment in which very large number of devices are existing.

Specifically, the M2M communication should be able to support many number of STAs. According to a currently defined wireless LAN system, it is assumed a case that maximum 2007 STAs are connected to a single AP. Yet, the M2M communication is discussing methods of supporting a case that more STAs (about 6000 STAs) are connected to a single STA. And, it is anticipated that there will be an application supporting/requiring a low transmission speed in the M2M communication. In order to smoothly support the application, for instance, an STA can recognize whether there exist data to be transmitted to the STA based on a TIM (traffic indication map) element in a wireless LAN system. Currently, methods of reducing a bitmap size of the TIM is under discussion. And, it is anticipated that there will be great amount of traffic where a transmission/reception interval is very long in the M2M communication. For instance, it is required to transmit and receive a very small amount of data in every long period (e.g., in every one month) such as the amount of using electricity/gas/water supply. Hence, although the number of STAs capable of being connected to a single AP considerably increases, methods of efficiently supporting a case that there are very few number of STA receiving data frame from the AP within a beacon interval are under discussion in the wireless LAN system.

As mentioned in the foregoing description, a wireless LAN technology is rapidly evolving. Besides the aforementioned examples, a technology for a direct link setup, enhancement of a media streaming capability, supporting an initial session setup of a high speed and/or a large scale, supporting an enlarged bandwidth and operating frequency and the like is developing.

Frame Structure

Figure 7:
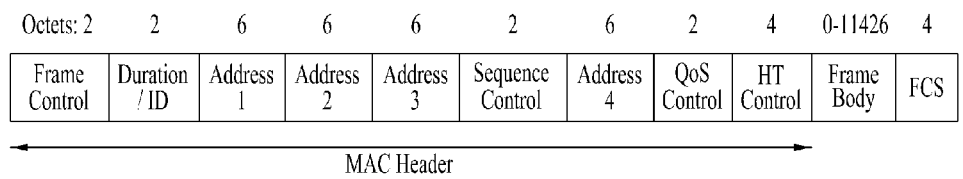
FIG. 7 is a diagram for an example of a MAC frame format of IEEE 802.11 system to which the present invention is applicable.

FIG. 7 is a diagram for an example of a MAC frame format of IEEE 802.11 system to which the present invention is applicable.

Referring to FIG. 7, a MAC frame format includes a MAC header (MHR), a MAC payload and a MAC footer (MFR). The MHR is defined by a region including a frame control field, a duration/ID field, an address 1 field, an address 2 field, an address 3 field, a sequence control field, an address 4 field, a QoS control field and a HT control field. A frame body field is defined by the MAC payload. Data intended to be transmitted by upper layer is positioned at the frame body field. The frame body field has a variable size. A frame check sequence (FCS) field is defined by the MAC footer and is used to detect an error of the MAC frame.

A minimum frame format is configured by the first three fields (the frame control field, the duration/ID field and the address 1 field) and a very last field (the FCS field). The first three fields and the last field exist in all frames. The remaining fields can exist in a specific frame type only.

Information included in each of the aforementioned fields may follow the definition of IEEE 802.11 system. And, the each of the aforementioned fields corresponds to an example of fields capable of being included in a MAC frame. Each field can be replaced with a different field or an additional field can be further included as well.

Figure 8:
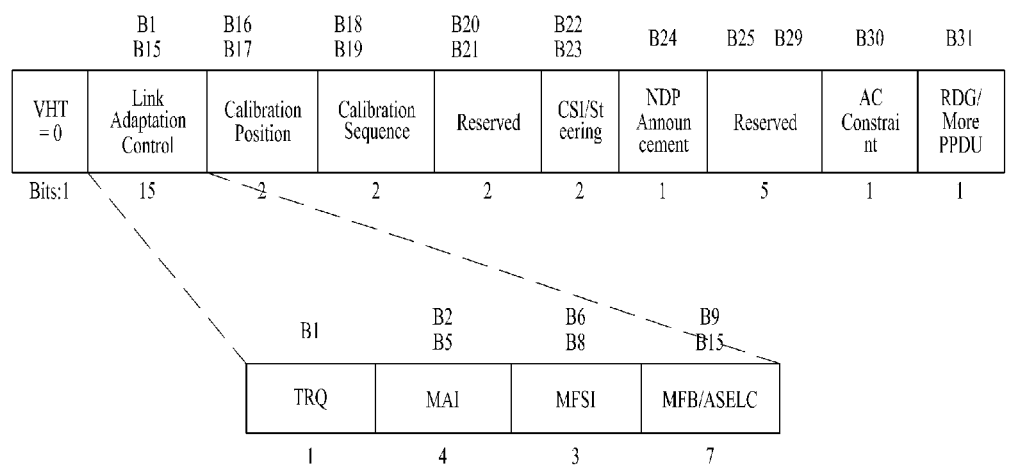
FIG. 8 is a diagram for an example of an HT format of an HT control field in a MAC frame according to FIG. 7.

FIG. 8 is a diagram for an example of an HT format of an HT control field in a MAC frame according to FIG. 7.

Referring to FIG. 8, the HT control field can include a VHT subfield, a link adaptation subfield, a calibration position subfield, a calibration sequence subfield, a channel state information (CSI)/steering subfield, an NDP (null data packet) announcement subfield, an AC (access category) constraint subfield, an RDG (reverse direction grant/more) PPDU subfield and a reserved subfield.

The link adaptation subfield can include a training request (TRQ) subfield, an MAI (MCS (modulation and coding scheme) request or an ASEL (antenna selection) indication) subfield, an MCS feedback sequence indication (MFSI) subfield, an MCS feedback and antenna selection command/data (MFB/ASELC) subfield.

If a sounding PPDU is requested to a responder, the TRQ subfield is set to 1. If the sounding PPDU is not requested to the responder, the TRQ subfield is set to 0. And, if the MAI subfield is set to 14, it indicates an antenna selection indication (ASEL indication) and the MFB/ASELC subfield is interpreted by the antenna selection command/data. Otherwise, the MAI subfield indicates an MCS request and the MFB/ASELC subfield is interpreted by an MCS feedback. When the MAI subfield indicates an MCS request (MRO), if MCS feedback is not requested, the MAI subfield is set to 0. If the MCS is requested, the MAI subfield is set to 1. The sounding PPDU indicates a PPDU delivering a training symbol usable for a channel estimation.

The aforementioned each of the subfields corresponds to an example of subfields capable of being included in the HT control field. Each field can be replaced with a different subfield. Or, an additional subfield can be further included.

Figure 9:
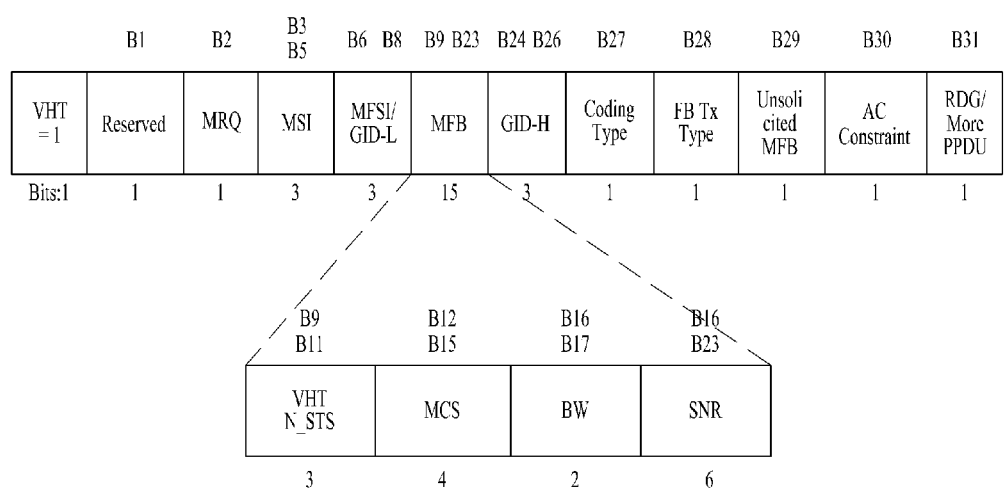
FIG. 9 is a diagram for an example of a VHT format of an HT control field in a MAC frame according to FIG. 7.

FIG. 9 is a diagram for an example of a VHT format of an HT control field in a MAC frame according to FIG. 7.

Referring to FIG. 9, the HT control field can include a VHT subfield, an MRO subfield, an MSI subfield, an MCS feedback sequence indication/group ID lowest bit (MFSI/GID-L: LSB of group ID) subfield, an MFB subfield, a group ID highest bit (GID-H: MSB of group ID) subfield, a coding type subfield, an MFC response transmission type (FB Tx type:

transmission type of MFB response) subfield, an unsolicited MFB subfield, an AC constraint subfield, an RDG/more PPDU subfield. And, the MFB subfield can include a VHT space-time stream number (N_STS: number of space time streams) subfield, an MCS subfield, a bandwidth (BW) subfield and a signal to noise ratio (SNR) subfield.

Table 1 shows explanation on each subfield in a VHT format of the HT control field.

TABLE 1

| Subfield | Meaning | Definition |
|---|---|---|
| MRQ | MCS request | If MCS feedback(solicited MFB) is requested, set to 1. Otherwise, set to 0. |
| MSI | MRO sequence identifier | If MRO subfield is set to 1, MSI subfield includes sequence number within a scope ranging from 0 to 6 identifying a specific request. If MRO subfield is set to 0, MSI subfield is reserved. |
| MFSI/GID-L | MFB sequence identifier/LSB of group ID | If unsolicited MFB subfield is set to 0, MFSI/GID-L subfield includes a reception value of MSI included in a frame indicated by MFB information. If unsolicited MFB subfield is set to 1, MFSI/GID-L subfield includes lowest 3 bits of a group ID of PPDU indicated by solicited MFB. |
| MFB | VHT N_STS, MCS, BW, SNR feedback | MFB subfield includes a recommended MFB. MCS = 15, VHT N_STS = 7 indicate that there is no feedback. |
| GID-H | MSB of group ID | If unsolicited MFB subfield is set to 1, GID-H subfield includes highest 3 bits of a group ID of PPDU indicated by the unsolicited MFB. |
| Coding type | Coding type of MFB response | If unsolicited MFB subfield is set to 1, coding type subfield includes 1 in case of coding information (BCC (binary convolution code)) indicated by the unsolicited MFB, 0 in case of LDPC (low-density parity check). Otherwise, reserved. |
| FB Tx type | Transmission type of MFB response | If unsolicited MFB subfield is set to 1 and FB Tx type subfield is set to 0, the unsolicited MFB indicates either unbeamformed VHT PPDU or transmit diversity using STBC (space-time block coding) VHT PPDU. If unsolicited MFB subfield is set to 1 and FB Tx type subfield is set to 1, the unsolicited MFB indicates beamformed SU-MIMO (single user MIMO) VHT PPDU. Otherwise, reserved. |
| Unsolicited MFB | Unsolicited MCS feedback indicator | If MFB is not a response of MRQ, set to 1. If MFB is a response of MRQ, set to 0. |
| Ac constraint | | If response for reverse direction grant (RDG) includes data frame from a traffic identifier (TID), set to 0. If response for reverse direction grant (RDG) includes a frame received from AC identical to last data frame received from an identical reverse direction (RD) initiator only, set to 1. |
| RDG/more PPDU | | When RDG/more PPDU subfield corresponds to 0, if reverse direction (RD) initiator transmits, it indicates there is no reverse direction grant (RDG). If reverse direction (RD) responder transmits, it indicates PPDU delivering MAC frame is last transmission. When RDG/more PPDU subfield corresponds to 1, if reverse direction (RD) initiator transmits, it indicates there exists reverse direction grant (RDG). If reverse direction (RD) responder transmits, there |

TABLE 1-continued

| Subfield | Meaning | Definition |
|---|---|---|
| | | exist following different PPDU after PPDU delivering MAC frame. |

The aforementioned each of the subfields corresponds to an example of subfields capable of being included in the HT control field. Each field can be replaced with a different subfield. Or, an additional subfield can be further included.

In the meantime, the MAC sub-layer delivers an MAC protocol data unit (MPDU) to a physical layer as a physical service data unit (PSDU). A PCCP entity adds a physical header and a preamble to the received PSDU and generates a PLCP protocol data unit (PPDU).

Figure 10:
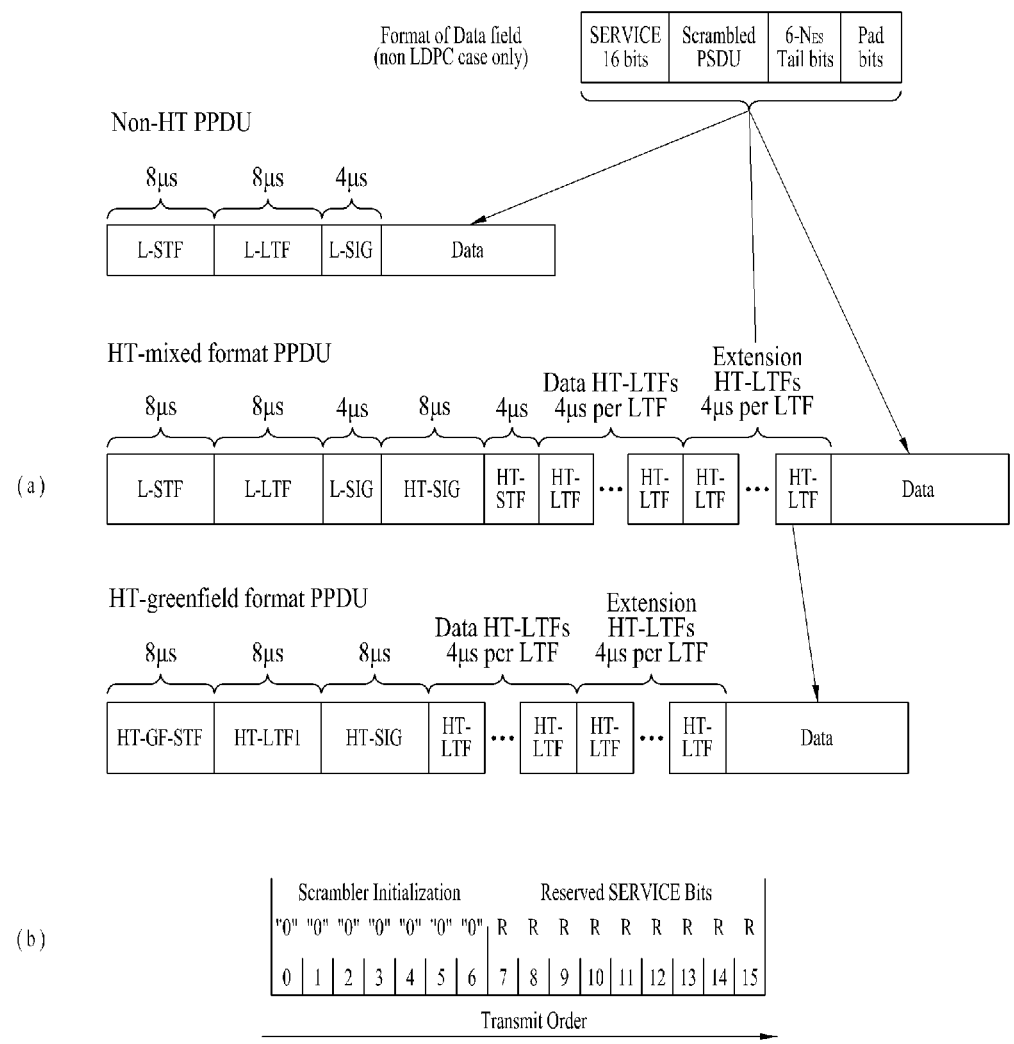
FIG. 10 is a diagram for an example of a PPDU frame format of IEEE 802.11n system to which the present invention is applicable.

FIG. 10 is a diagram for an example of a PPDU frame format of IEEE 802.11n system to which the present invention is applicable.

FIG. 10 (a) shows an example of a PPDU frame according to a non-HT format, an HT mixed format and an HT-greenfield format.

The non-HT format indicates a frame format for a legacy system (IEEE 802.11a/g) STA. A non-HT format PPDU includes a legacy format preamble consisting of a legacy-short training field (L-STF), a legacy-long training field (L-LTF) and a legacy-signal (L-SIG) field.

The HT mixed format permits a communication with a legacy system STA and indicates a frame format for IEEE 802.11n STA at the same time. The HT mixed format PPDU includes a legacy format preamble consisting of the L-STF, the L-LTF and the L-SIG and an HT format preamble consisting of an HT-short training field (HT-STF), an HT-long training field (HT-LTF) and an HT-signal (HT-SIG) field. Since the L-STF, the L-LTF and the L-SIG mean legacy fields for backward compatibility, a part from the L-STF to the L-SIG is identical to the non-HT format. An STA can identify the mixed format PPDU using the HT-SIG field appearing after the part.

The HT-greenfield format is a format not compatible with a legacy system. The HT-greenfield format indicates a format used for an IEEE 802.11n STA. an HT-greenfield format PPDU includes a greenfield preamble consisting of an HT-greenfield-STF (HT-GF-STF), an HT-LTF1, an HT-SIG and one or more HT-LTFs.

A data field includes a service field, PSDU, tail bit and pad bit. All bits of the data field are scrambled.

FIG. 10 (b) shows the service field included in the data field. The service field has 16 bits. Each bit is numbered by 0 to 15. Each bit is sequentially transmitted from a bit #0. The bit #0 to a bit #6 are set to 0 and used to synchronize a descrambler installed in a transmitting end.

Figure 11:
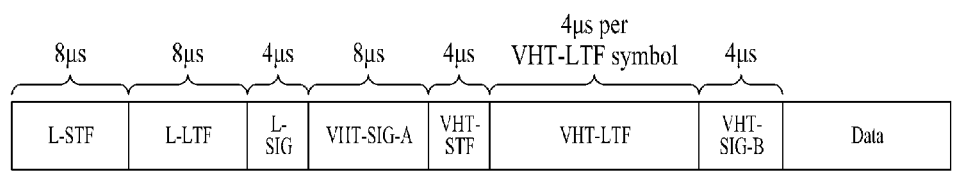
FIG. 11 is a diagram for an example of a VHT PPDU frame format of IEEE 802.11ac system to which the present invention is applicable.

FIG. 11 is a diagram for an example of a VHT PPDU frame format of IEEE 802.11ac system to which the present invention is applicable.

Referring to FIG. 11, a VHT format PPDU includes a legacy format preamble consisting of L-STF, L-LTF and L-SIG and a VHT format preamble consisting of VHT-SIG-A, HT-STF and HT-LTF before a data field. Since the L-STF, the L-LTF and the L-SIG mean a legacy field for backward compatibility, a part from the L-STF to the L-SIG is identical to the non-HT format. An STA can identify the VHT format PPDU using the VHT-SIG field appearing after the part.

The L-STF is a field used for frame detection, auto gain control (AGC) diversity detection, coarse frequency/time synchronization and the like. The L-LTF is a field used for fine frequency/time synchronization, channel estimation and the like. The L-SIG is a field used for transmitting legacy control information. The VHT-SIG-A is a VHT field used for transmitting control information included in VHT STAs in common. The VHT-STF is a field used for AGC for MIMO and a beamformed stream. The VHT-LTFs is a field used for channel estimation for MIMO and a beamformed stream. The VHT-SIG-B is a field used for transmitting specified control information.

Medium Access Mechanism

In a wireless LAN system according to IEEE 802.11, a basic access mechanism of MAC (medium access control) corresponds to a CSMA/CA (carrier sense multiple access with collision avoidance) mechanism. The CSMA/CA mechanism is also called a DCF (distributed coordination function) of IEEE 802.11 MAC. Basically, "listen before talk" access mechanism is adopted. According to this sort of access mechanism, an AP and/or an STA can perform CCA (clear channel assessment) to sense a radio channel or medium during a prescribed time interval (e.g., DIFS (DCF inter-frame space) prior to beginning of transmission. As a result of sensing, if it is determined that the medium is in an idle status, a frame is transmitted using the corresponding medium. On the contrary, if it is detected as the medium is in an occupied status, the AP and/or the STA does not start transmission of its own, waits for accessing the medium in a manner of configuring a delay period (e.g., random backoff period) and may be then able to attempt frame transmission after the delay period. When the random backoff period is applied, since it is expected that many STAs attempt the frame transmission after waiting for time period different from each other, collision can be minimized.

And, IEEE 802.11 MAC protocol provides an HCF (hybrid coordination function). The HCF is performed based on the DCF and a PCF (point coordination function). The PCF is a polling based synchronous access scheme. In order to make all receiving Aps and/or STAs receive a data frame, the data frame is periodically polled. And, the HCF includes an EDCA (enhanced distributed channel access) and an HCCA (HCF controlled channel access). The EDCA is a contention based access scheme used by a provider to provide a data frame to a plurality of users. The HCCA is a non-contention based channel access scheme using a polling mechanism. And, the HCF includes a medium access mechanism used for improving QoS (quality of service) of WLAN and can transmit QoS data in both CP (contention period) and CFP (contention free period).

Figure 12:
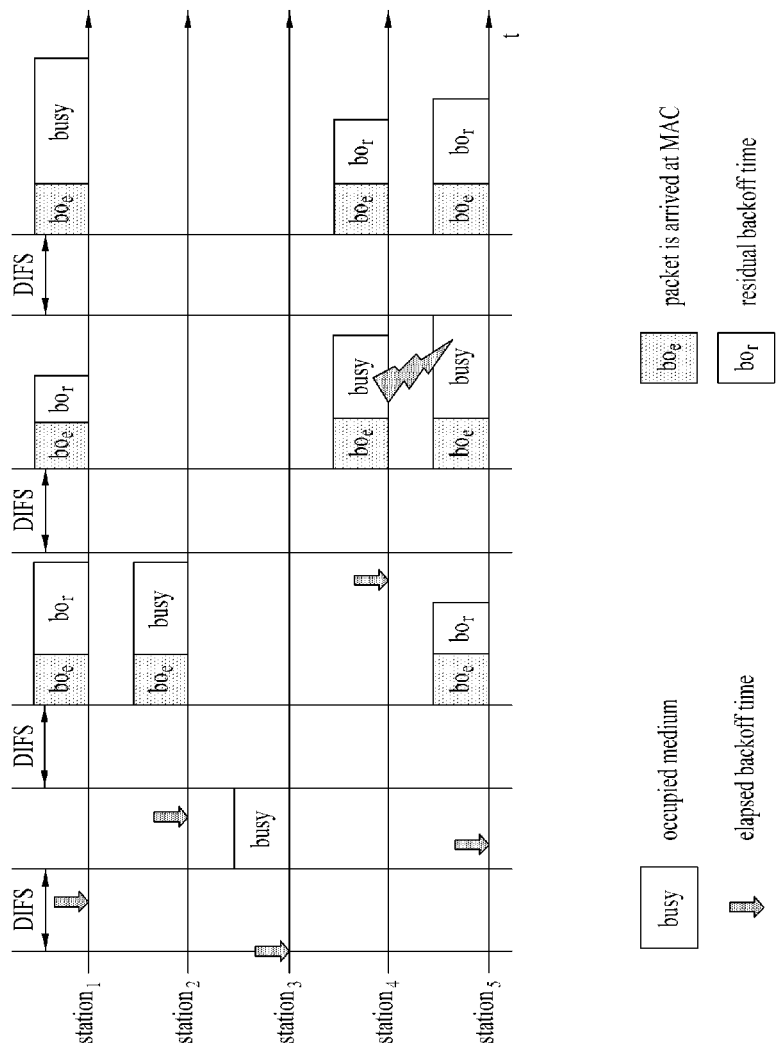
FIG. 12 is a diagram for explaining a backoff process in a wireless LAN system to which the present invention is applicable.

FIG. 12 is a diagram for explaining a backoff process in a wireless LAN system to which the present invention is applicable.

An operation based on a random backoff period is explained with reference to FIG. 12.

If a medium in an occupied or busy status changes its status to an idle status, many STAs can attempt transmission of a data (or a frame). In this case, as a method of minimizing a collision, each of the STAs selects a random backoff count, waits for time as long as slot time corresponding to the random backoff count and may be then able to attempt the transmission. The random backoff count has a pseudo-random integer value and can be determined by one among values ranging from 0 to CW. In this case, the CW is a contention window parameter value. A CWmin is given as an initial value of the CW parameter. If transmission fails (e.g., ACK for a transmitted frame is not received), a doubled value can be given for the CW parameter. If the CW parameter value becomes CWmax, data transmission can be tried out until the data transmission is successful while the CWmax value is maintained. When the data transmission is successful, the CW parameter is reset to the CWmin value. It is preferable to configure the CW, the CEmin and the CWmax with 2n−1 (n=0, 1, 2, . . . ).

Once a random backoff process starts, an STA continuously monitors a medium while a backoff slot is count downed according to a determined backoff count value. If the medium is monitored as in an occupied status, countdown is stopped and waits. When the medium is in an idle status, remaining countdown is resumed.

According to an example shown in FIG. 12, when a packet to be transmitted arrives at a MAC of an STA 3, the STA 3 checks that a medium is in an idle status as long as a DIFS and may be then able to directly transmit a frame. Meanwhile, remaining STAs monitor that the medium is in an occupied (busy) status and standby. In this case, data to be transmitted may occur in each of an STA 1, an STA 2 and an STA 5. If it is monitored that the medium is in the idle status, each of the STAs waits for time as long as the DIFS and may be then able to perform countdown of a backoff slot according to a random backoff count value selected by each of the STAs. According to the example shown in FIG. 12, the STA 2 has selected a smallest backoff count value and the STA 1 has selected a largest backoff count value. In particular, the example of FIG. 12 shows a case that a residual backoff time of the STA 5 is shorter than a residual backoff time of the STA 1 when the STA 2 finishes the backoff count and starts frame transmission. The STA 1 and the STA 5 temporarily stop countdown and standby while the STA 2 is occupying the medium. If the occupation of the STA 2 ends and the medium is back in the idle status, the STA 1 and the STA 5 wait for time as long as the DIFS and then resume the backoff count. In particular, the STA 1 and the STA 5 countdown remaining backoff slot as long as the residual backoff time and may be then able to start the frame transmission. Since the residual backoff time of the STA 5 is shorter than the residual backoff time of the STA 1, the STA 5 starts the frame transmission. Meanwhile, data to be transmitted may also occur in the STA 4 while the medium is occupied by the STA 2. In this case, if the medium is in the idle status, the STA 4 waits for time as long as the DIFS and may be then able to performs countdown according to a random backoff count value selected by the STA 4 and start the frame transmission. The example of FIG. 12 shows a case that the residual backoff time of the STA 5 is coincidentally matched with the random backoff count value of the STA 4. In this case, a collision may occur between the STA 4 and the STA 5. If the collision occurs, since both the STA 4 and the STA 5 cannot receive ACK, data transmission fails. In this case, the STA 4 and the STA 5 select a random backoff count value after enlarging the CW value as much as twice and can perform the countdown. Meanwhile, the STA 1 stand by while the medium is occupied by the STA 4 and the STA 5 due to the transmission. If the medium is back in the idle status, the STA 1 waits for time as long as the DIFS and may be then able to perform the frame transmission when the residual backoff time elapses.

Sensing Operation of STA

As mentioned in the foregoing description, the CSMA/CA mechanism includes a physical carrier sensing directly sensed by the AP and/or the STA. besides the physical carrier sensing, the CSMA/CA mechanism also includes a virtual carrier sensing. The virtual carrier sensing is configured to compensate a problem capable of being occurred in a medium access such as a hidden node problem. In order to perform the virtual carrier sensing, a MAC of a wireless LAN system may use a network allocation vector (NAV). The NAV is a value used for indicating remaining time to an available status of a medium, indicated by an AP and/or an STA currently using the medium or having authority of using the medium for a different AP and/or an STA. Hence, a value configured as the NAV corresponds to a duration for which the use of the medium is reserved by the AP and/or the STA transmitting a corresponding frame. The STA receiving the NAV cannot access the media for the duration. For instance, the NAV can be configured according to a value of a duration field of a MAC header of a frame.

And, in order to reduce possibility of collision, a robust collision detect mechanism has been introduced. Regarding this, it shall be described with reference to FIG. 13 and FIG. 4. Although an actual carrier sensing range and a transmission range may not be identical to each other, for clarity, assume that they are identical to each other.

FIG. 13 is a diagram for explaining a hidden node and an exposed node.

FIG. 13 (*a*) shows an example of a hidden node. The example shows a case that an STA A is communicating with an STA B and an STA C has information to be transmitted. Specifically, although the example shows a situation that the STA A transmits information to the STA B, before data is transmitted to the STA B by the STA C, it may be determined as a medium is in an idle status when a carrier sensing is performed. This is because transmission (i.e., occupation of the medium) of the STA A may not be sensed in a position of the STA C. In this case, since the STA B receives information of the STA A and information of the STA C at the same time, a collision occurs. In this case, the STA A may be considered as a hidden node of the STA C.

FIG. 13 (*b*) shows an example of an exposed node. In a situation that an STA B is transmitting data to an STA A, the example shows a case that an STA C has data to be transmitted from an STA D. In this case, if the STA C performs a carrier sensing, it may be determined as a medium is occupied due to the transmission of the STA B. Hence, although the STA C has data to transmit to the STA D, since the medium is sensed as an occupied status, the STA C should wait until the medium becomes the idle status. Yet, since the STA A is positioned at the outside of a transmission range of the STA C, transmission from the STA C and transmission from the STA B may not be collided with each other in terms of the STA A. Hence, the STA C unnecessarily waits until the STA B stops the transmission. In this case, the STA C may be considered as an exposed node of the STA B.

Figure 14:
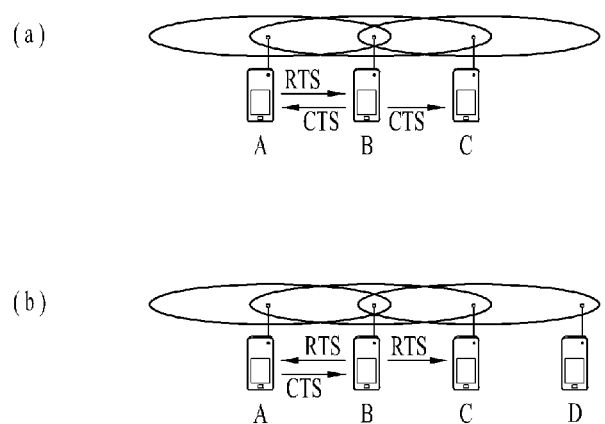
FIG. 14 is a diagram for explaining an RTS and a CTS.

FIG. 14 is a diagram for explaining an RTS and a CTS.

In order to efficiently use a collision avoidance mechanism in a situation shown in the example of FIG. 13, such a short signaling packet as RTS (request to send), CTS (clear to send) and the like can be used. The RTS/CTS between two STAs can make a neighboring STA(s) overhear. By doing so, the neighboring STA(s) can consider whether information is transmitted between the two STAs. For instance, if an STA intending to transmit data transmits an RTS frame to an STA receiving the data, the STA receiving the data transmits a CTS frame to neighboring UEs to inform that the STA receiving the data will receive the data.

FIG. 14 (a) shows an example for a method of solving a hidden node problem and assume a case that both the STA A and the STA C intend to transmit data to the STA B. If the STA A transmits the RTS to the STA B, the STA B transmits the CTS to all STAs around the STA B including the STA A and the STA C. As a result, the STA C waits until the data transmission of the STA A and the STA B ends, thereby avoiding a collision.

FIG. 14 (b) shows an example for a method of solving an exposed node problem. By making the STA C overhear RTS/CTS transmission between the STA A and the STA B, it is able to determine that a collision will not occur although the STA C transmits data to a different STA (e.g., STA D). In particular, the STA B transmits the RTS to all UEs around the STA B and the STA A, which actually has data to be transmitted, transmits the CTS. Since the STA C has received the RTS only and has not received the CTS of the STA A, the STA C is able to know that the STA A is positioned at the outside of carrier sensing of the STC C.

IFS (Inter-Frame Space)

Time interval between two frames is defined as an IF (inter-frame space). An STA determines whether a channel is used during the IFS via carrier sensing. A DCF MAC layer defines 4 types of IFS and priority of occupying a wireless medium is determined according to the 4 types of the IFS.

For the IFS, a specific value is set according to a physical layer irrespective of a bit-rate of an STA. A type of the IFS includes an SIFS (short IFS), a PIFS (PCF IFS), a DIFS (DCF IFS) and an EIFS (extended IFS). The SIFS (short IFS) is used when an RTS/CTS or an ACK frame is transmitted and has top priority. The PIFS (OCF IFS) is used when a PCF frame is transmitted. The DIFS (DCF IFS) is used when a DCF frame is transmitted. The EIFS (extended IFS) is used when a frame transmission error occurs only and does not have a fixed space.

Figure 15:
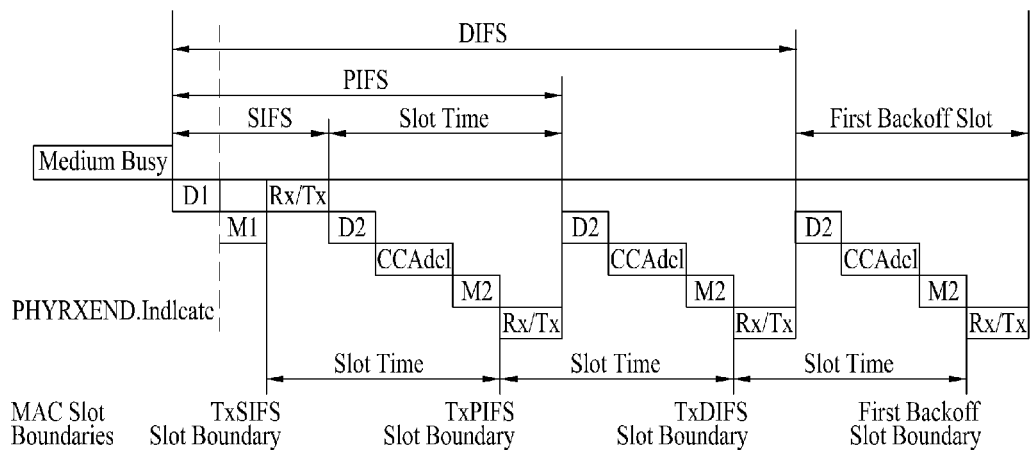
FIG. 15 is a diagram for an example of a relation of an IFS.

A relation between each of the IFSs is defined by time gap on a medium and a relevant attribute is provided by a physical layer as shown in FIG. 15 in the following.

FIG. 15 is a diagram for an example of a relation of an IFS.

An end timing of a last symbol of a PPDU indicates an end of transmission and a first symbol of a preamble of a next PPDU indicates a start of transmission in all medium timings. All MAC timings can be determined with reference to a PHY-TXEND.confirm primitive, a PHYTXSTART.confirm primitive, a PHY-RXSTART.indication primitive and a PHY-RXEND.indication primitive.

Referring to FIG. 15, SIFS time (aSIFSTime) and a slot time (aSlotTime) can be determined according to a physical layer. The SIFS time has a fixed value and the slot time can dynamically change according to a change of a wireless propagation time (aAirPropagationTime). The SIFS time and the slot time can be defined as Formula 1 and Formula 2 in the following.

$a\text{SIFSTime} = a\text{RXRFDelay} + a\text{RXPLCPDelay} + a\text{MACProcessingDelay} + a\text{RXTXTurnaroundTime}$ [Formula 1]

$a\text{SlotTime} = a\text{CCATime} + a\text{RxTxTurnaroundTime} + a\text{AirPropagationTime} + a\text{MACProcessingDelay}$ [Formula 2]

The PIFS and the SIFS can be defined as Formula 3 and Formula 4 in the following.

$\text{PIFS} = a\text{SIFSTime} + a\text{SlotTime}$ [Formula 3]

$\text{DIFS} = a\text{SIFSTime} + 2Sa\text{SlotTime}$ [Formula 4]

The EIFS can be calculated like as Formula 5 in the following based on the SIFS, the DIFS and ACK transmission time (ACKTxTime). The ACK transmission time (ACKTxTime) is represented by microseconds necessary for transmitting an ACK frame, which includes a preamble in a lowest physical layer mandatory rate, a PLCP header and additional physical layer dependent informations.

$\text{EIFS} = a\text{SIFSTime} + \text{DIFS} + \text{ACKTxTime}$ [Formula 5]

The SIFS, the PIFS and the DIFS explained in FIG. 15 are measured on MAC slot boundaries (TxSIFS, TxPIFS, TxDIFS) different from each other on a medium. In order to make IFS timings different from each other on the medium to be matched with each other after a CCA result of a previous slot time is detected, a slot boundary can be defined by time on which a transmitter is turned on by a MAC layer. Each of the MAC slot boundaries for the SIFS, the PIFS and the DIFS can be defined by Formula 6 to Formula 8 in the following.

$\text{TxSIFS} = \text{SIFS} + a\text{RxTxTurnaroundTime}$ [Formula 6]

$\text{TxPIFS} = \text{TxSIFS} + a\text{SlotTime}$ [Formula 7]

$\text{TxDIFS} = \text{TxSIFS} + 2Sa\text{SlotTime}$ [Formula 8]

Power Management

As mentioned in the foregoing description, channel sensing should be performed before an STA performs transmission and reception in a wireless LAN system. Yet, sensing a channel all the time causes constant power consumption of the STA. There is no big difference between power consumption in a receiving state and power consumption in a transmitting state. Hence, if the receiving state is continuously maintained, it becomes big burden on an STA operating with a limited power (i.e., battery operated STA). Hence, if the STA maintains a state of reception standby to consistently sense a channel, it leads the STA to inefficiently consume power without any special benefit in terms of a wireless LAN processing ratio. In order to solve the above-mentioned problem, the wireless LAN system supports a power management (PM) mode of the STA.

The power management mode of an STA is divided into an active mode and a power save (PS) mode. An STA basically operates in the active mode. An STA operating in the active mode maintains an awake state. The awake state corresponds to a state in which such a normal operation as frame transmission and reception, channel scanning and the like is feasible. Meanwhile, an STA operating in the PS mode operates in a manner of switching between a sleep state and the awake state. The STA operating in the sleep state operates with minimum power and performs neither frame transmission/reception nor channel scanning.

Since an STA consumes less power in an awake state compared to a sleep state, the more an STA operates in the sleep state as long as possible the more power consumption is reduced. Hence, an operation period of the STA increases. Yet, since it is impossible to transmit and receive a frame in the sleep state, it is not possible for the STA to unconditionally operate in the sleep state. If the STA operating in the sleep state has a frame to transmit to an AP, the STA can transmit the frame in a manner of switching to the awake state from the sleep state. Meanwhile, if the AP has a frame to transmit to the STA, the STA operating in the sleep state cannot receive the frame and cannot even know whether there exists the frame to receive. Hence, in order for the STA to know whether there exist a frame to be transmitted to the STA (or, to receive the frame if exists), it may be necessary for the STA to switch to the awake state with a specific period.

Figure 16:
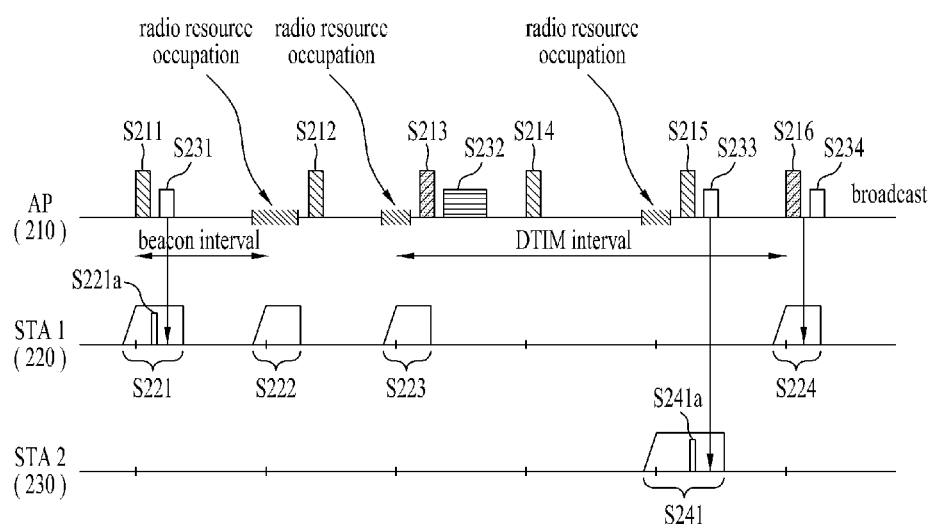
FIG. 16 is a flowchart for explaining a power management operation.

FIG. 16 is a flowchart for explaining a power management operation.

Referring to FIG. 16, an AP 210 transmits a beacon frame to STAs in a BSS with a prescribed interval [S211, S212, S213, S214, S215 and S216]. The beacon frame includes a TIM (traffic indication map) information element. The TIM information element includes information indicating whether there exists buffered traffic for STAs connected to the AP 210 and whether a frame is to be transmitted by the AP. The TIM element can be classified into a TIM used for indicating a unicast frame and a DTIM (delivery traffic indication map) used for indicating a multicast or a broadcast frame.

The AP 210 can transmit one DTIM whenever 3 beacon frames are transmitted.

An STA 1 220 and an STA 2 230 are STAs operating in the PS mode. The STA 1 220 and the STA 230 can be configured to receive the TIM element transmitted by the AP 210 in a manner of switching to the awake state from the sleep state in every wakeup interval of a prescribed period. Each of the STAs can calculate timing of switching to the awake state based on its own local clock. In an example of FIG. 15, assume that a clock of an STA is matched with a clock of an AP.

For instance, the prescribed wakeup interval can be configured to make the STA 1 220 receive the TIM element in every beacon interval in a manner of being switched to the awake state. Hence, when the AP 210 transmits a first beacon frame [S211], the STA 1 220 can switch to the awake state [S221]. The STA 1 220 receives the beacon frame and can obtain the TIM element. If the obtained TIM element indicates that there exists a frame to be transmitted to the STA 1 220, the STA 1 220 can transmit a PS-poll (power save-poll) frame, which makes a request for the AP 210 to transmit a frame, to the AP 210 [S221a]. The AP 210 can transmit the frame to the STA 1 220 in response to the PS-poll frame. Having received the frame, the STA 1 220 operates in a manner of switching to the sleep state again.

When the AP 210 transmits a second beacon frame, since a medium is in a state of being occupied by a different device (busy medium), the AP 210 cannot transmit the beacon frame in accordance with an accurate beacon interval and may transmit the beacon frame on a delayed timing [S212]. In this case, although the STA 1 220 switches the operation mode into the awake mode according to a beacon interval, since the STA 1 is unable to receive the beacon frame transmitted by being delayed, the STA 1 switches to the sleep state again [S222].

When the AP 210 transmits a third beacon frame, the beacon frame may include a TIM element configured as a DTIM. Yet, since the medium is in the state of being occupied (busy medium), the AP transmits the beacon frame in a manner of delaying the transmission [S213]. The STA 1 220 operates in a manner of switching to the awake state in accordance with the beacon interval and can obtain the DTIM via the beacon frame transmitted by the AP 210. Assume a case that the DTIM obtained by the STA 1 220 indicates that there is no frame to be transmitted to the STA 1 220 and there exists a frame for a different STA. In this case, the STA 1 220 checks that there is no frame to be transmitted to the STA 1 and may operate in a manner of switching back to the sleep state. Having transmitted the beacon frame, the AP 210 transmits a frame to a corresponding STA [S232].

The AP 210 transmits a fourth beacon frame [S214]. Yet, since the STA 1 220 was unable to obtain information indicating that there is no buffered traffic for the STA 1 via the TIM element which is previously received twice, the STA 1 can adjust an wakeup interval to receive the TIM element. Or, if signaling information used for adjusting an wakeup interval value of the STA 1 220 is included in the beacon frame transmitted by the AP 210, the wakeup interval value of the STA 1 220 can be adjusted. According to the present example, the STA 1 220 can be configured to switch a management state from a state of switching the management state to receive the TIM element in every beacon interval to a state of switching the management state to the wakeup state in every 3 beacon intervals. Hence, since the STA 1 220 maintains the sleep state when the AP 210 transmits the fourth beacon frame [S214] and a fifth beacon frame [S215], the STA 1 cannot obtain a corresponding TIM element.

When the AP 210 transmits a sixth beacon frame [S216], the STA 1 220 operates in a manner of switching to the awake state and can obtain a TIM element included in the beacon frame [S224]. Since the TIM element corresponds to a DTIM indicating that there exists a broadcast frame, the STA 1 220 can receive a broadcast frame transmitted by the AP 210 instead of transmitting a PS-poll frame to the AP 210 [S234]. Meanwhile, an wakeup interval set to an STA 2 230 can be configured by a period longer than a period of the STA 1 220. Hence, the STA 2 230 switches to the awake state on a timing that the AP 210 transmits the fifth beacon frame [S215] and can obtain the TIM element [S241]. The STA 2 230 knows there exists a frame to be transmitted to the STA 2 via the TIM element and can transmit the PS-poll frame to the AP 210 to make a request for frame transmission. The AP 210 can transmit a frame to the STA 2 230 in response to the PS-poll frame [S233].

In order to manage such a mode as the power saving mode mentioned earlier in FIG. 16, the TIM element can include a TIM indicating whether there exists a frame to be transmitted to an STA or a DTIM indicating whether there exist a broadcast/multicast frame. The DTIM can be implemented by a field configuration of the TIM element.

Figure 17:
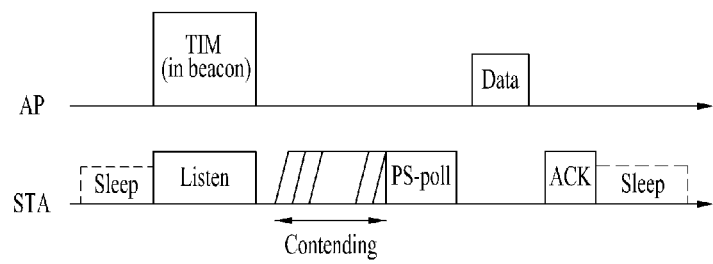
FIGS. 17 to 19 are diagrams for explaining an operation of an STA, which has received a TIM, in detail.
Figure 18:
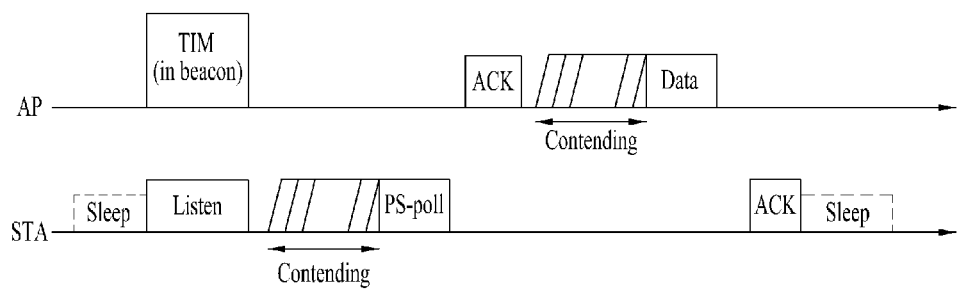
Figure 19:
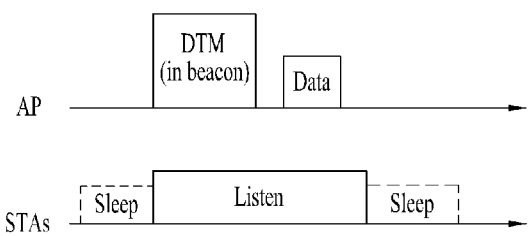

FIGS. 17 to 19 are diagrams for explaining an operation of an STA, which has received a TIM, in detail.

Referring to FIG. 17, an STA switches to an awake state from a sleep state to receive a beacon frame including a TIM from an AP and can know there exists a buffered traffic to be transmitted to the STA by interpreting the TIM element. The STA performs contending with different STAs to access a medium used for transmitting a PS-poll frame and may be then able to transmit the PS-poll frame to the AP to make a request for data frame transmission. Having received the PS-poll transmitted by the STA, the AP can transmit a frame to the STA. the STA receives a data frame and can transmit a confirmation response (ACK) in response to the data frame. Subsequently, the STA can switch back to the sleep state again.

As shown in FIG. 17, having received the PS-poll frame from the STA, the AP can operate according to an immediate response scheme corresponding to a scheme transmitting a data frame in a prescribed time (e.g., SIFS (short inter-frame space) after the PS-poll reception. Meanwhile, after the AP received the PS-poll frame, if a data frame to be transmitted to the STA is not ready for the SIFS time, the AP may operate in accordance with a deferred response scheme. Regarding this, it shall be described with reference to FIG. 18.

In an example of FIG. 18, similar to the operations mentioned in FIG. 16, the STA switches to the awake state from the sleep state, receive the TIM from the AP and transmit the PS-poll frame to the AP by performing contending. Despite receiving the PS-poll frame, if the AP is not ready for a data frame during the SIFS, the AP can transmit an ACK frame to the STA instead of the data frame. After the ACK frame is transmitted, if the data frame is ready, the AP can transmit the data frame to the STA after contending is performed. The STA transmits an ACK frame indicating that the data frame is successfully received to the AP and may be then able to switch to the sleep state.

FIG. 19 shows an example of transmitting a DTIM by the AP. In order for STAs to receive a beacon frame including a DTIM element from the AP, the STAs can switch to the awake state from the sleep state. The STAs are able to know that a multicast/broadcast frame will be transmitted via the received DTIM. Having transmitted the beacon frame including the DTIM, the AP can immediately transmit a data (i.e., multicast/broadcast frame) without an operation of transmitting and receiving a PS-poll frame. Having received the beacon frame including the DTIM, the STAs receive data while maintaining the awake state and can switch back to the sleep state after the data reception is completed.

According to the method of managing the power saving mode, which is based on the TIM (or DTIM) mentioned earlier with reference to FIG. 17 to FIG. 19, STAs can check whether there exists a data frame to be transmitted to the STAs via STA identification information included in the TIM element. The STA identification information may correspond to information related to an AID (association identifier), which is an identifier allocated to an STA when the STA is associated with an AP.

The AID is used as a unique identifier for each STA within a BSS. As an example, according to a current wireless LAN, the AID can be allocated by one of values ranging from 1 to 2007. According to a currently defined wireless LAN system, 14 bits can be allocated for the AID in a frame transmitted by an AP and/or an STA. Although the AID value can be allocated up to 16383, values ranging from 2008 to 16383 are configured as reserved values.

FIG. 20 is a diagram for an example of a TIM element format.

Referring to FIG. 20, a TIM element can include an element ID field, a length field, a DTIM count field, a DTIM period field, a bitmap control field and a partial virtual bitmap field. The length field indicates length of an information field. The DTIM count field indicates how many beacon frames (including a current frame) exist before a next DTIM is transmitted. The TIM period field indicates the number of beacon intervals between contiguous DTIMs. If all TIMs correspond to a DTIM, the DTIM period field has a value of 1. The DTIM period value is reserved by 0 and configured by 1 octet. The bitmap control field consists of one octet. A bit 0 of the bitmap control field is a traffic indicator bit for AID 0. If one or more group addressed MSDUs (MAC service data unit)/MMPUDs (MAC management protocol data unit) have data to transmit in an AP or a mesh STA, the DTIM count field is set to 0 and the bit 0 of the bitmap control field is set to 1. Remaining 7 bits of the first octet indicates a bitmap offset. A traffic indication virtual bitmap indicated by an AP generating a TIM or the mesh STA is consisted of 2008 bits (=251 octets). A bit number N (where 0≤N≤2007) of a bitmap can be indicated by an octet number N/8 and a bit number (N mod 8). Each bit of the traffic indication virtual bitmap indicates whether there exist data to be transmitted by an AP. If there exist data to be transmitted by the AP for an individually addressed MSDU/MMPDU (AID=N), the bit number N is set to 1. If there does not exist data to be transmitted, the bit number N is set to 0.

The above-mentioned fields correspond to an example of fields capable of being included in a TIM element. Each of the fields can be replaced with a different field or an additional field can be further included.

Power Management Using Automatic Power Saving Delivery

Besides the power saving method based on the aforementioned PS-poll, IEEE 802.11e system provides an APSD (automatic power saving delivery) method. The APSD can be mainly classified into a scheduled APSD (s-APSD) method and an unscheduled APSD (u-APSD). The u-APSD indicates a mechanism delivering a downlink frame by an STA supporting the APSD while an AP supporting the APSD operates in a power saving mode in a manner of switching back and forth between an awake state and a sleep (doze) state.

A QoS (quality of service) AP capable of supporting the APSD can signal such capability as the aforementioned to an STA using a beacon, a probe response, an APSD subfield of a capability information field in a (re)association response management frame.

In order for STAs to receive a part or all of a bufferable unit (BU) of the STAs delivered from an AP during an unscheduled service period (hereinafter abbreviated, u-SP), the STAs can use the U-APSD. If the u-SP is not in progress, the u-SP can be started in a manner that an STA transmits a QoS data belonging to an access category (AC) configured as trigger-enabled or a QoS Null frame to the AP. In this case, a transmitted uplink frame is called a trigger frame. An aggregated MPDU (A-MPDU) includes one or more trigger frames. The unscheduled SP is terminated after the AP attempts to transmit an AC capable of being delivered and at least one BU to the corresponding STA. Yet, if a maximum service period length field (MAX SP length field) of a (re)association request frame of the corresponding STA has a value which is not 0, the value of the field is limited to within an indicated value.

In order to receive the BU from the AP during the u-SP, the STA designates one or more delivery-enabled ACs and trigger-enabled ACs of the STA. In order to provide QoS, IEEE 802.11e system defines 8 priorities different from each other and 4 ACs based on the priorities. The STA can configure the AP to use the U-APSD using two methods. First of all, the STA can configure an individual U-APSD flag bit in a QoS info subfield of a QoS capability element delivered in a (re)association request frame. If the U-APSD flag bit corresponds to 1, it indicates that a corresponding AC is a delivery-enabled AC and a trigger-enabled AC. If all 4 U-APSD flag subfields in the (re)association request frame correspond to 1, all ACs related to the STA can be delivered and triggered during the (re)association. If all 4 U-APSD flag subfields in the (re)association request frame correspond to 0, all ACs related to the STA can be delivered during the (re)association and a trigger-enabled AC does not exist. Or, the STA can designate one or more trigger-enabled ACs and delivery-enabled ACs by transmitting a schedule subfield configured by 0 in a traffic stream (TS) information field of an ADDTS (add traffic stream) request frame including an APSD subfield configured by 1 according to an AC to the AP. It is able to put an APSD configuration in a TSPEC request before a static U-APSD configuration delivered in the QoS capability element. In other word, a U-APSD configuration of a prescribed previous AC can be overwrote with the TSPEC request. The corresponding request can be transmitted for an AC where an ACM subfield corresponds to 0.

The STA can configure a trigger-enabled AC or a delivery-enabled AC in a manner of configuring a TSPEC including an APSD subfield and a schedule subfield configured by 1 and 0, respectively in uplink or downlink direction. An uplink TSPEC, a downlink TSPEC or a bidirectional TSPEC including the APSD subfield configured by 1 and the schedule subfield configured by 0 can configure the trigger-enabled AC and the delivery-enabled AC. An uplink TSPEC, a downlink TSPEC or a bidirectional TSPEC including an APSD subfield configured by 0 and the schedule subfield configured by 0 can configure a trigger-disabled AC and a delivery-disabled AC.

A scheduled service period (hereinafter abbreviated, s-SP) starts with a fixed time interval specified in a service interval field. If an access policy controls a channel access, in order for an STA to use the s-SP for TS, the STA can transmit an ADDTS request frame including an APSD subfield configured by 1 of a TS info field in a TSPEC element to an AP. On the contrary, if the access policy supports a contention-based channel access, in order to use the s-SP for the TS, the STA can transmit an ADDTS request frame including the APSD subfield configured by 1 and a schedule subfield of the TS info field in the TSPEC element to the AP. If the APSD mechanism is supported by the AP and the AP accepts the corresponding ADDTS request frame transmitted by the STA, the AP may respond with an ADDTS response frame including a schedule element indicating that a requested service is able to be provided by the AP. If lowest 4 octets of a timing synchronization function are identical to a value specified in a service start time field, an initial s-SP starts. An STA using the s-SP can initially wake up to receive a BU individually addressed buffered for the STA and/or a polled BU from the AP or a hybrid coordinator (HC). Thereafter, the STA can wake up with prescribed time interval identical to a service interval (SI). The AP can adjust service start time via a successful ADDTS response frame (a response for an ADDTS request frame) and a schedule element of a schedule frame (transmitted on a different timing).

The s-SP starts on the service start time indicated in a schedule element transmitted in response to TSPEC and wakeup time scheduled in response to SI. Thereafter, the STA wakes up on timing according to Formula 9 in the following.

(TSF service start time)mod minimum$SI$=0    [Formula 9]

If an s-SP period is supported in a BSS, an STA can use both U-APSD and S-APSD for ACs different from each other on an identical time. If a scheduled delivery for an AC is set to the STA, an AP does not transmit a BU, which uses the corresponding AC, during SP initialized by a trigger frame and does not process a BU using an AC received from the STA by the trigger frame. The AP does not reject any ADDTS request frame indicating to use both the S-APSD and the U-APSD, which are configured to use an identical AC on an identical time. APSD can be used for delivering an individually addressed BU only. Delivering a BU addressed by group may follow a frame delivery rule used for a group-addressed BU.

A non-AP STA using the U-APSD may not receive all frames transmitted from an AP during a service period due to interference observed in the non-AP STA. In this case, although identical interference is not observed, the AP can determine that the non-AP STA does not properly receive a frame. A U-APSD coexistence capability enables the non-AP STA to indicate transmission duration, which is requested to be used for u-SP, to the AP. By using the transmission duration, the AP can transmit a frame during the SP and the non-AP STA can improve possibility of receiving a frame in an interfered situation. The U-APSD coexistence capability decreases possibility for the AP not to properly receive a frame during a service period.

FIG. 21 is a diagram for an example of a U-APSD coexistence element format.

Referring to FIG. 21, an element ID field is identical to a U-APSD coexistence value. A length of an optional sub-element existing at 12 added to a value of a length field. A value, which is not 0, in a TSF 0 offset field indicates the number of microseconds after time (TSF time 0) on which a non-AP STA is aware that interference has begun. An AP uses the TSF 0 offset field together with an interval/duration field for a transmission to the non-AP STA.

An STA including a value of which "dot1MgmtOptionUAPSDCoexistenceActivated" is 'true' is defined as an STA supporting U-APSD coexistence. In this case, the STA including the value of which "dot1MgmtOptionUAPSDCoexistenceActivated" is 'true' configures a U-APSD coexistence field (APSD coexistence field) by 1. Otherwise, the field is configured by 0. (If it is previously notified to both an AP and a non-AP STA that U-APSD coexisting capability is supported), the non-AP STA associated with the STA can transmit an ADDTS request frame including a U-APSD coexistence element to the AP.

Content of the ADDTS request frame not including the U-APSD coexisting element is called a base ADDTS request in the following description. If the ADDTS request frame is successfully received, the AP processes content of the base ADDTS request frame. If the AP determines that the base ADDTS request frame is not able to be approved, the AP does not process the U-APSD coexisting element. On the contrary, if the AP determines that the base ADDTS request frame is able to be approved, the AP processes the U-APSD coexisting element. If the AP supports frame transmission during a U-APSD service period for a value of duration specified in an interval/duration field of the U-APSD coexisting element, the AP can approve the ADDTS request. Otherwise, the AP may reject the ADDTS request.

When the AP previously approved an ADDTS request including the U-APSD coexistence, the non-AP STA continuously using a QoS service, which is provided by the ADDTS request frame not including the U-APSD coexistence, can terminate the use of the U-APSD coexistence in a manner of transmitting the ADDTS request frame not including the U-APSD coexistence element. If the non-AP STA intends to terminate the use of all QoS services provided by the ADDTS request frame including the U-APSD coexistence, the non-AP STA can transmit a DELTS (delete traffic stream) request frame to the AP.

If a previous ADDTS request frame is invalidated by a last successfully received ADDTS request frame, the non-AP STA can transmit multiple ADDTS request frames to the AP. The AP supporting the U-APSD coexistence and accepting an ADDTS request can limit U-APSD coexistence service period according to a parameter specified in the U-APSD coexisting element of the ADDTS frame. And, the AP transmits a frame to make a request for the non-AP STA in accordance with a rule in the following.

First of all, if the non-AP STA specifies a TSF 0 offset value by a value which is not 0 in the U-APSD coexistence element, the AP does not transmit a frame to the non-AP STA in the outside of the U-APSD existence service period. The U-APSD existence service period starts when the AP receives a U-APSD trigger frame and ends after a transmission period specified by Formula 10 in the following.

End of transmission period=$T$+(Interval
    (($T$TSF0Offset)mod Interval))    [Formula 10]

In Formula 10, T indicates time of receiving the U-APSD trigger frame by the AP. And, interval indicates a firstly appearing value among a duration/interval field value of the U-APSD coexistence element and timing on which an EOSP (end of service period) bit configured by 1 is successfully transmitted.

On the contrary, if the non-AP STA specifies the TSF 0 offset value by 0 in the U-APSD coexistence element, the AP does not transmit a frame to the non-AP STA in the outside of the U-APSD existence service period. The U-APSD existence service period starts when the AP receives a U-APSD trigger frame and ends after a transmission period specified by Formula 11 in the following.

Endoftransmissionperiod=*T*+Duration  [Formula 11]

In Formula 11, T indicates time of receiving the U-APSD trigger frame by the AP. And, Duration indicates a firstly appearing value among a duration/interval field value of the U-APSD coexistence element and timing on which an EOSP (end of service period) bit configured by 1 is successfully transmitted.

If the AP determines that the AP has a frame to transmit more during the U-APSD coexistence service period and the frame will be successfully transmitted before the service period expires, an additional (more) bit can be configured by 1.

If a frame is anticipated as a last frame to be transmitted to the non-AP STA during the U-APSD coexistence service period, the AP can configure the EOSP bit by 1 in the corresponding frame. If the last frame is not successfully transmitted to the non-AP STA before the U-APSD coexistence service period expires, the AP transmits a QoS null frame of which the EOSP bit is configured by 1. The non-AP STA can enter a doze state when the U-APSD coexistence service period expires.

Hidden Node Problem in PS-Poll

FIG. 22 is a diagram for explaining an operation of an STA according to a PS-poll mechanism and a U-APSD mechanism.

FIG. 22 (*a*) shows an example of a PS-poll mechanism and FIG. 22 (*b*) shows an example of a U-APSD mechanism.

Referring to FIG. 22 (*a*), an STA knows whether there exist buffered traffic to be transmitted to the STA by an AP via a TIM element of a beacon. If there exists any traffic to be transmitted to the STA, the STA performs contending with other STAs according to a PS-poll mechanism and then transmits a PS-poll frame to the AP to make a request for transmitting a data frame. After the AP received the PS-poll frame from the STA, if the AP does not prepare a data frame to be transmitted to the STA in SIFS time, the AP can transmit an ACK frame to the STA instead of the data frame. Thereafter, if the data frame is ready to be transmitted to the STA after the ACK frame is transmitted, the AP performs contending with different STAs, exchanges an RTS/CTS frame with the STA and then transmits the data frame to the STA. In this case, the step of exchanging the RTS/CTS frame with the STA can be omitted. If the STA succeeds in receiving the data frame, the STA transmits an ACK frame to the AP and switches to the sleep state. Yet, since the AP can transmit a single PSDU to the STA only at a time, if the AP has a considerable amount of data to transmit to the STA, data transmission may be inefficiently performed.

As a solution for the aforementioned problem, the STA can receive a plurality of PSDUs from the AP at a time using a service period (SP) of the STA in a manner of using the aforementioned U-APSD mechanism.

Referring to FIG. 22 (*b*), first of all, the STA knows that there exist data to be transmitted to the STA by the AP via the TIM element of the beacon. Subsequently, when the STA wants to receive the corresponding data, the STA performs contending with different STAs, informs the AP that a service period (SP) of the STA has begun in a manner of transmitting a trigger frame to the AP and asks the AP to transmit the data. The AP transmits an ACK frame to the STA in response to the trigger frame. Subsequently, the AP performs contending with different STAs, exchanges an RTS/CTS frame with the STA and transmits the data to the STA. In this case, the data may include a plurality of data frames. In this case, the step of exchanging the RTS/CTS may be omitted. When the AP transmits a last data frame, if an EOSP field of the data frame is set to 1, the STA recognizes the EOSP field, transmits an ACK frame to the AP and ends the SP of the STA to switch to the sleep state. As mentioned in the foregoing description, if the U-APSD mechanism is used, since the STA can receive data whenever the STA like by initiating the SP of the STA and can receive a plurality of data frames during a single SP. By doing so, the data can be efficiently received.

Modified Trigger Frame Format

Yet, in the foregoing description, the RTS/CTS frame exchange, which is required to prevent the data transmission from a hidden node problem, causes a considerable amount of overhead when the data is transmitted. And, after the STA asked the AP to transmit data in a manner of transmitting the trigger frame, since it takes a considerable amount of time for the AP to prepare the data to be transmitted to the STA and perform contending with different STAs to transmit the data, the STA wastes unnecessary energy.

Hence, when the STA receives data from the AP, the present invention intends to propose a trigger frame capable of efficiently setting a service period and transmitting/receiving information on the service period with a simplified overhead.

In the aforementioned example, it is explained that the STA is able to set time for transceiving a service with the AP using a QoS null frame format, which is not actually transmitting data despite the QoS null frame corresponds to a data frame. Yet, since the legacy QoS null frame format has big overhead, the present invention intends to use a modified QoS null frame format, which has a smaller overhead compared to the legacy QoS null frame format. For clarity, the modified QoS null frame format used in the present invention can be called a short QoS null frame format or a compressed QoS null frame format.

Figure 23:
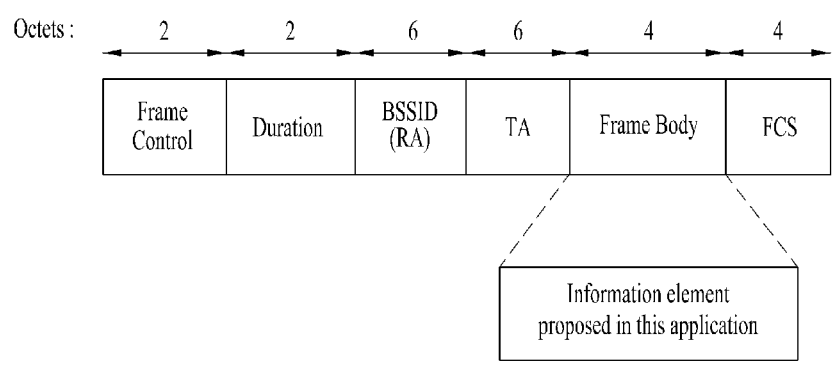
FIG. 23 is a diagram for an example of a structure of a modified QoS null frame applicable to the present invention.

FIG. 23 is a diagram for an example of a structure of a modified QoS null frame applicable to the present invention. As shown in the example of FIG. 23, the modified QoS null frame format can include a frame control field, a duration field, a BSSID (basic service set identification) field, a TA (transmitter address) field, a frame body field and a FCS (frame check sequence) field. Yet, it is not necessary to include all information blocks shown in FIG. 23 in the short QoS null frame format. A part of the information blocks can be omitted. Moreover, a size of each of the information blocks can be applied in a manner of being different from the example shown in FIG. 23 as well. As an example, the basic service set identification (BSSID) field can be configured by an RA (receiver address) field instead.

In the example of FIG. 23, the frame control field can be used for defining a subtype indicating a short QoS null frame format. An AID (association ID) field requiring 2 octets can be positioned instead of the transmitter address field of 6 octets shown in FIG. 23.

The frame body field can include service period information. In this case, the service period information can be included in a frame body in a manner of being consisted of information element.

FIG. 24 is a diagram for an example of an information element including service period information. As shown in the example of FIG. 24, the information element indicating the service period information can include an element ID field, a length field, a reserved field and a service period field. The reserved field can be omitted or used for a different usage according to a size of a different field or necessity.

The element ID field is used for identifying a type of an information element and the length field may indicate a length of the information element. A length of a service period can be defined in the service period field.

Although it is not depicted, the information element including the service period information can further include a time stamp offset field in us (micro second) unit as well as the service period field.

The more an STA is managed based on an APSD mechanism, the more information on an APSD downlink delivery as well as the service period information can be included in the frame body field. In this case, the information on the APSD downlink delivery can include downlink data size configuration (limitation) information of the APSD. In this case, the downlink data size configuration (limitation) information of the APSD can be configured by a field of 2 bits in case of exchanging APSD configuration with each other. Moreover, the information on the APSD downlink delivery may further include one or more information fields in the following.

i) AC-Related Information

The AC-related information indicates which TID (traffic ID) is granted downlink delivery. For instance, the AC-related information can be configured by 4 bits. Each bit of the 4 bits can indicate whether the traffic ID is granted 4 types of ACs including AC-BE (best effort), AC_BK (background), AC_VI (video) and AC_VO (voice).

ii) TID Information

A TID is used for selecting UP (user priority) of a preferentially processed QoS or a TSPEC for a parameterized QoS. For instance, the TID information may have a full ID value of 4 bits or a partial ID value of a size smaller than 4 bits. The TID information can be inserted instead of the AC information under a non-EDCA concept.

The information on the APSD downlink delivery can selectively include either i) the AC-related information field or ii) the TID information field. In this case, the information on the APSD downlink delivery may further include a flag of minimum 1 bit. The flag can be used to identify whether information included in the information on the APSD downlink delivery corresponds to the AC-related information or the TID information.

The information on the APSD downlink delivery may be included in the frame body in a manner of being configured by a next field of the service period field shown in FIG. 24 or information element different from the information element including the service period information shown in FIG. 24. A structure in case that the information on the APSD downlink delivery is configured by a separate information element is described in detail with reference to FIG. 25 in the following.

FIG. 25 is a diagram for an example of an information element in various forms including information on APSD downlink delivery. As shown in the example of FIG. 25 (a), the information element including the information on the APSD downlink delivery may include APSD downlink data size configuration information (e.g., APSD DL size limitation) and the AC-related information (e.g., allowed AC). And, as shown in the example shown in FIG. 25 (b), the information element including the information on the APSD downlink delivery may include PSD downlink data size configuration information (e.g., APSD DL size limitation) and the TID information (e.g., full TID). Or, as shown in the example of FIG. 25 (c), the information element including the information on the APSD downlink delivery may selectively include either the AC-related information or the TID information together with the PSD downlink data size configuration information. In this case, the information element may further include a flag of minimum 1 bit indicating whether an inserted field corresponds to the AC-related information or the TID information.

Although the information elements explained with reference to FIG. 24 and FIG. 25 can be transmitted in a manner of being included in the frame body of the MAC frame, according to a different embodiment of the present invention, the aforementioned information elements can be transmitted in a manner of being included in an SIG field corresponding to a PHY channel. In this case, if a field indicating that a short QoS null frame format is applied is included in the SIG field, it may distinguish it from a legacy SIG.

In case of applying a QoS null frame format including an information element, it may cause difficulty in that an AP should prepare available frames in a queue to perform downlink delivery in anticipated wakeup time. In order to resolve the difficulty, the AP informs an STA of whether to support a dynamic delivery assignment during an APSD negotiation procedure and an STA can be managed according to the dynamic delivery assignment.

Configuration of Service Period Based on Poll/Triggering Procedure

When a MAC frame format is used to transmit a trigger frame used for starting a u-SP, unnecessarily big overhead may occur. Hence, in order to efficiently transmit the trigger frame, a new MAC frame format from which an unnecessary information field not used in a MAC header is excluded can be defined and applied for a power saving trigger of an STA. Hence, besides the aforementioned modified trigger frame format, the present invention proposes a short frame format configured to set a service period and transceive a set parameter between an STA and an AP. A short frame can be classified into a short data frame and a short null frame according to whether a service period simultaneously starts when an STA transmits data to an AP. Regarding this, it shall be described with reference to FIG. 26 in the following.

Figure 26:
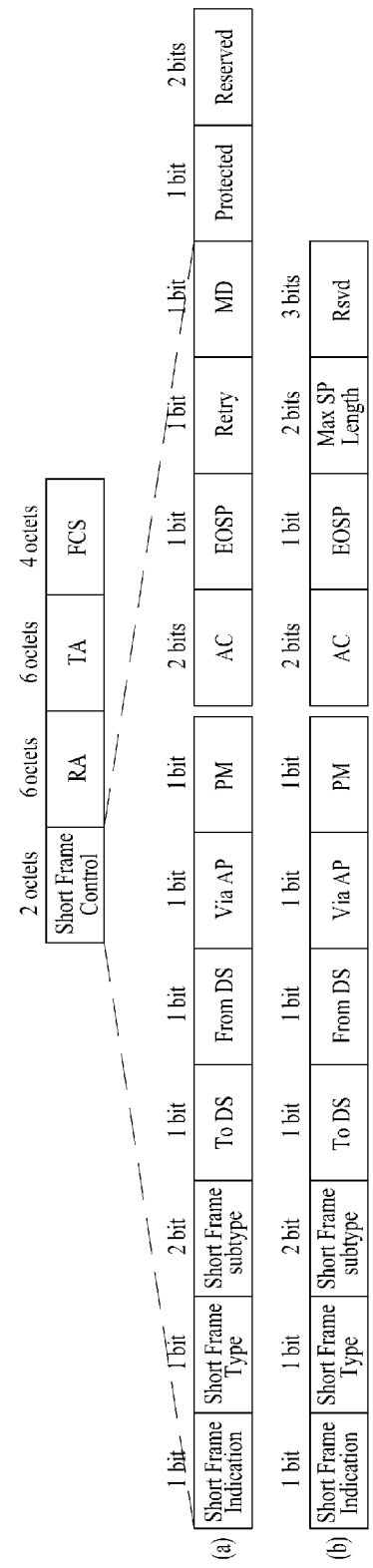
FIG. 26 is a diagram for explaining an example of a short frame.

FIG. 26 is a diagram for explaining an example of a short frame. FIG. 26 (a) is a diagram for an example of a short data frame. As shown in the example of FIG. 26, the short data frame can include a short frame control field, an RA (receiver address) field, a TA (transmitter address) field and a FCS (frame check sequence) field.

The receiver address field indicates an MAC address identifying a device (e.g., an AP or an STA) directly receiving a short data frame and the transmitter address field may indicate an MAC address identifying a device (e.g., an STA) transmitting a short data frame. The frame check sequence field is used to search for an error of a short data frame.

The short frame control field of the short data frame can include a short frame indication field, a short frame type field, a short frame subtype field, a To DS field, a From DS field, a Via AP field, a PM field, an AC field, an EOSP field, a retry field, an MD field, a protected field and a reserved field. Yet, it is not necessary for the short frame control field to include all of the aforementioned fields. Of course, in some cases, a part of the aforementioned fields can be omitted.

The short frame indication field of the short frame control field indicates whether a corresponding frame corresponds to a short frame or a normal frame.

If a corresponding frame is indicated by the short frame control field as a short frame, the short frame type field can be used to define a type of the short frame. Specifically, the short frame control field can indicate whether the short frame corresponds to a short data frame or a short null frame mentioned in the following.

The short frame subtype field defines subtypes of a short frame. The short frame subtype field may also indicate whether a short frame corresponds to a short data frame or a short null frame.

The To DS field and the From DS field indicate whether a corresponding short frame corresponds to a data frame heading to a distribution system or a data frame coming out from the distribution system. For instance, when a communication is performed between STAs situating within an identical BSS, since it is not relevant to the DS, both the To DS field and the From DS field can be configured by '0'. Unlikely, in case that an STA transmits a short frame to the DS, the To DS field is configured by '1' and the From DS field can be configured by '0'. On the contrary, in case that then STA receives a short frame from the DS, the To DS field is configured by '0' and the From DS field can be configured by '1'. When an STA is communicating with an STA situating at a different BSS, both the To DS field and the From DS field can be configured by '1'.

The Via AP field excludes other conventionally existing address information and can be used for the use of substitution if necessary.

The PM field indicates whether a transmitter is in a power saving mode. For instance, if the transmitter is in the power saving mode, the PM field can be configured by '1'. On the contrary, if the transmitter is in an activated state, the PM field can be configured by '0'.

The AC field can be used to indicate an AC related to a short frame or assign the AC. Specifically, the AC field can indicate at least one AC capable of being delivered or triggered by an STA. In this case, the AC related to the short frame can include at least one selected from the group consisting of AC_BE (best effort), AC_BK (background), AC_VI (video) and AC_VO (voice). Although FIG. 1 shows an AC of 2 bits, the AC field can be configured to extend to 4 bits in order for the 4 bits to respectively indicate whether to permit 4 types of the AC including AC_BE (best effort), AC_BK (background), AC_VI (video) and AC_VO (voice). According to a different example of the present invention, a TID (traffic ID) field can be inserted instead of the AC field. In this case, the TID field can be configured to have full TID information in a manner of being configured by 4 bits. Or, the TID field can be configured to have partial TID information in a manner of being configured by a size less than 4 bits.

The EOSP field indicates an end of a service period and the retry field indicates whether a short frame corresponds to a retransmission frame.

FIG. 26 (b) is a diagram for an example of a short null frame. In FIG. 26 (b), since the use of the fields, which are defined by terminologies identical to the terminologies of the fields in FIG. 26 (a), is identical to what is mentioned earlier with reference to the drawing of FIG. 26 (a), detailed explanation on the fields is omitted. Referring to FIG. 26 (b), unlike the short frame control field of the short data frame, the retry field, a more data field and the protected field can be omitted in a short frame control field of a short null frame. And, a maximum service period length (Max SP length) field can be included in the short frame control field of the short null frame.

The maximum service period length (Max SP length) field can be used to indicate the maximum number of buffered data units transmitted to an STA triggering a service period. In this case, the data units may include at least one selected from the group consisting of MSDUs (AMC service data unit), A-MSDUs and MMPDUs.

Table 2 shows an example of an indication value according to an index value of the maximum service period length field.

TABLE 2

| Index value of Max SP length | description |
| --- | --- |
| 00 | AP transmits all buffered MSDUs/A-MSDUs/MMPDUs |
| 01 | AP transmits maximum 2 buffered MSDUs/A-MSDUs/MMPDUs |
| 10 | AP transmits maximum 4 buffered MSDUs/A-MSDUs/MMPDUs |
| 11 | AP transmits maximum 6 buffered MSDUs/A-MSDUs/MMPDUs |

When the number of transmitted data units becomes identical to the maximum number determined by the maximum service period length field, a service period may end.

In general, a field including all parameters of a service period has a length of 4 octets. The maximum service period length field of minimum 2 bits is inserted into a short data null frame instead of the service period field of 4 octets to reduce overhead.

A length (e.g., 2 bits) of the maximum service period length field is configured by a value identical to a value configured in an APSD configuration step. By doing so, corresponding short null frame transmission can be configured in a manner of being relevant to APSD downlink delivery information. This is intended to use a short null frame under an APSD mechanism.

An end of a service period can be indicated using an EOSP field of a data frame together with the maximum service period length field of the short null frame. This makes an STA consume power for a service period of the STA only and transmit/receive data.

According to the example shown in FIG. 26, the RA (receiver address) field may be configured by a basic service set identification (BSSID) field. And, the transmitter address (TA) field can be substituted by an association ID (AID) field of 2 octets. Yet, in order to substitute the TA field with the AID field, it should assume that environment capable of giving transmission ambiguity should not be developed in a manner of applying such a mechanism as AID change, update and the like to a system.

As mentioned in the foregoing description with reference to FIGS. 26 (a) and (b), the short data frame and the short null frame can have a common structure up to the power management (PM) field. In case of the short data frame transmitting a data, data transmission is supported by the retry field, the more data (MD) field and the protected field. In case of the short null frame, which triggers data reception only without transmitting data, each of the information fields between two short frames can be efficiently configured according to its usage in a manner of setting information on a service period.

Yet, it is not necessary for all information blocks shown in FIG. 26 to be included in a short frame. A part of the information blocks can be omitted. Moreover, a size of each information block or an arrangement order can be applied in a manner of being different from the example shown in FIG. 26.

Power Management Using SP-Poll Frame

The present invention proposes a power saving method based on an SP-poll (service period poll) as well as a power saving method based on a PS-poll, an APSD and a U-APSD. In case that the SP-poll is transmitted to an AP, an STA not only informs the AP of an SP of the STA but also asks the AP to transmit data. The SP-poll can be classified into an immediate SP-poll scheme and a deferred SP-poll scheme according to a form of transmitting/receiving data.

Figure 27:
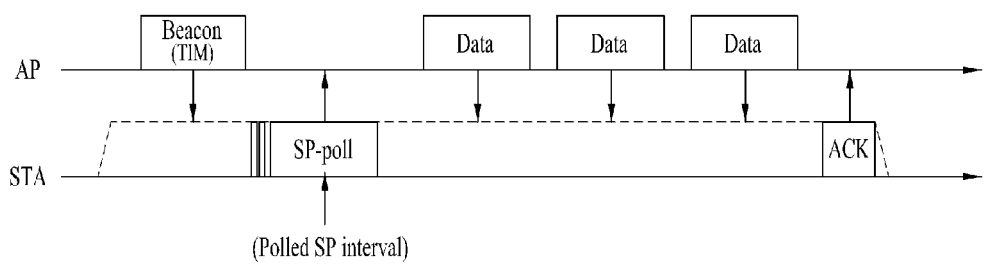
FIG. 27 is a diagram for explaining an example of an immediate SP-poll scheme.

FIG. 27 is a diagram for explaining an example of an immediate SP-poll scheme. An STA checks a TIM element of a beacon signal received from an AP to determine whether there exist data to be received from the AP. Having determined that there exist data to be received from the AP via the TIM element of the beacon signal, the STA can transmit an SP-poll frame to the AP by performing contention. Having received the SP-poll, the AP can transmit a data frame to the STA after an SIFS elapses after the SP-poll is received. The AP can continuously transmit a plurality of data frames during an SP determined by the SP-poll.

When the SP polled by the SP-poll is necessary to be ended, the AP sets an EOSP (end of service period) value of a last data frame among data frames transmitted to the STA during the polled service period to '1' and the STA transmits an ACK message to the AP in response to the last data frame to end the polled service period.

As a different example, a length of the polled service period can be defined by a value of a duration field included in the SP-poll. By doing so, the AP can transmit a data frame in accordance with a duration of the polled SP although the EOSP value of the last data frame among the data frames transmitted to the STA during the polled service period is not set to '1'. The STA can also be configured to transmit a data frame according to the duration of the polled SP. In particular, the STA can end the polled SP of the STA in accordance with the duration of the polled service period.

As shown in the example of FIG. 27, if data is received from the AP within the SP designated by the SP-poll transmitted by the STA, the SP-poll can be called an immediate SP-poll.

Figure 28:
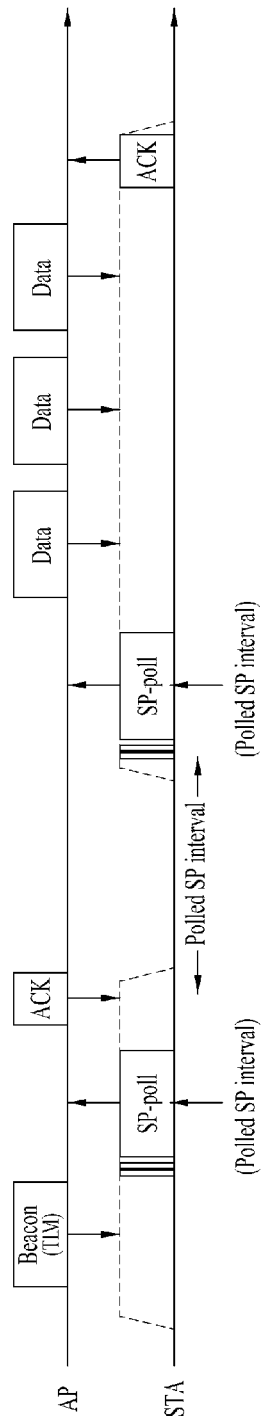
FIG. 28 is a diagram for explaining an example of a deferred PS-poll scheme.

FIG. 28 is a diagram for explaining an example of a deferred PS-poll scheme. An STA checks a TIM element of a beacon signal received from an AP to determine whether there exist data to be received from the AP. Having determined that there exist data to be received from the AP via the TIM element of the beacon signal, the STA can transmit an SP-poll frame to the AP by performing contention. As shown in the example of FIG. 27, if the AP, which has received the SP-poll, is able to transmit a data frame to the STA after an SIFS elapses, the AP can transmit a data frame during the polled SP. Yet, if the AP cannot transmit a data frame to the STA although the SIFS elapses after the SP-poll is received, the AP can transmit an ACK frame to the STA after the SIFS elapses in response to the reception of the SP-poll. Having received the ACK frame from the AP, the STA recognizes that the AP is unable to immediately transmit a data frame, ends the polled service period and can ask the AP to transmit data again via a next SP-poll. When a data frame is not able to be received from the AP during the polled service period, the SP-poll transmitted to designate the polled service period can be called a deferred SP-poll.

A polled service period interval field (polled SP interval field) can be included in an SP-poll frame. The polled SP interval field can include interval information until a next polled service period starts after a polled service period ends. The AP can recognize a start time of the next polled service period via the polled service period interval field of the SP-poll frame. The AP can prepare for a data frame to be transmitted to the STA during the polled service period interval.

Having received an ACK frame from the AP, the STA ends the polled service period. When the polled service period interval elapses, the STA transmits an SP-poll to the AP again to inform the AP of the start of the polled SP and can ask the AP to transmit a data frame. Having received the SP-poll, the AP can continuously transmit prepared data frames to the STA after an SIFS elapses. Since the STA receives data from the AP within the polled service period after the SP-poll is transmitted, the corresponding SP-poll can be called an immediate SP-poll. In particular, according to the example shown in FIG. 28, a first SP-poll corresponds to the deferred SP-poll. On the contrary, a second SP-poll may correspond to the immediate SP-poll. A method of ending a polled service period designated by the immediate SP-poll is identical to the method mentioned earlier with reference to FIG. 27.

Since there is a limit in terms of a period for an STA to occupy a medium, there is also a limit in terms of an amount of data for an AP to transmit data to the STA in a single polled service period. Hence, if the AP has great amount of data to transmit to the STA, it may be impossible for the AP to transmit all data to the STA in a single polled SP. In this case, the STA may receive the great amount of data from the AP using a plurality of polled service periods. Regarding this, it shall be described with reference to an example of FIG. 29 in the following.

Figure 29:
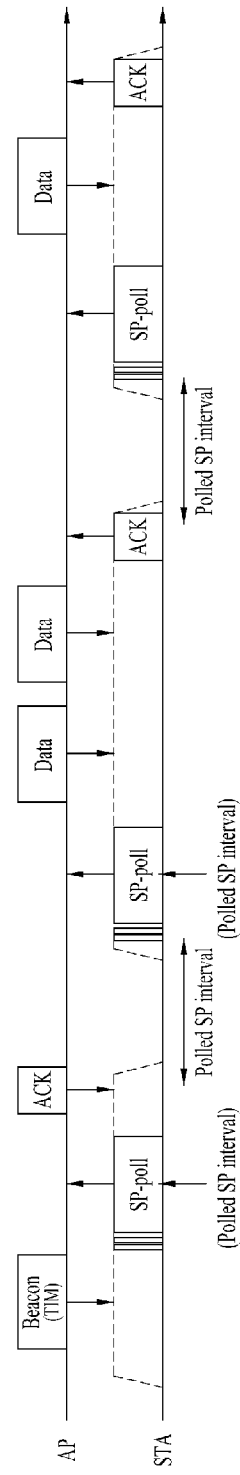
FIG. 29 is a diagram for explaining an example that data is transmitted using a plurality of polled service periods.

FIG. 29 is a diagram for explaining an example that data is transmitted using a plurality of polled service periods. Since an AP transmits an ACK frame in response to an SP-poll for a first polled service period, a first SP-poll can be defined as a deferred SP-poll. Since the STA receives data from the AP in response to the SP-poll for a second polled service period, a second SP-poll can be defined as an immediate SP-poll. In this case, a more data (MD) field can be included in each data frame transmitted to the STA by the AP. The more data frame can be included in a frame control field of a data frame. The STA can determine whether there exist data to be transmitted to the STA from the AP after the end of the polling service period in a manner of checking the more data field of the data frame.

The AP can inform the STA that there exist more data to transmit to the STA in a manner of setting the MD field of a last frame transmitted in the second polled service period to '1'. Having received the data frame in which the MD field is set to 1, the STA ends the second polled service period and can transmit a third SP-poll to the AP to receive additional data after a polled service period interval determined by the second SP-poll elapses.

Since the AP is able to recognize that a third polled service period will start when the polled service period interval elapses after the second polled service period ends via the second SP-poll in advance, the AP prepares to transmit remaining data frames, receives a third SP-poll and may be then able to transmit the remaining data frames to the STA when the SIFS elapses.

As shown in the example of FIG. 29, if the STA is able to receive data from the AP via a plurality of polled service periods, the STA switches to a sleep mode between polled service periods (i.e., polled service period intervals) to save power. And, in case of using the SP-poll, since the STA can receive a plurality of data frames for a single SP, the STA can efficiently receive data. In terms of the AP, since the AP can transmit data by receiving an SP-poll frame only instead of transmitting a data frame by exchanging an RTS and a CTS with each other, the AP can efficiently transmit.

Figure 30:
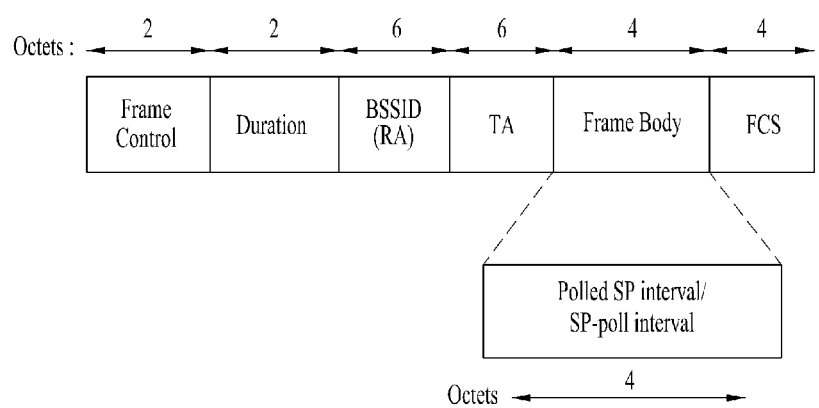
FIG. 30 is a diagram for an example of an SP-poll frame format.

FIG. 30 is a diagram for an example of an SP-poll frame format. Referring to FIG. 30, an SP-poll frame can include a frame control field, a duration field, a basic service set identification (BSSID) field, a transmitter address (TA) field, a frame body field and a frame check sequence (FCS) field. Yet, it is not necessary for the SP-poll frame to include all information blocks shown in FIG. 30. A part of the information blocks can be omitted. Moreover, a size of each of the information blocks can be differently applied in a manner of being different from the example shown in FIG. 30.

The frame body field can include at least one of a polled service period interval (polled-SP interval) field and a service period polling interval (SP-polling interval) field. The polled-SP interval field indicates interval information until a next polled service field starts after a corresponding service period ends. The SP-polling interval field may indicate interval information between a corresponding SP-poll frame and a next SP-poll frame.

If a frame body includes the SP-polling interval field instead of the polled-SP interval field, the AP may recognize a start point of a next polled service period using a polling interval field of a deferred SP-poll frame.

NAV Configuration for SP

Figure 31:
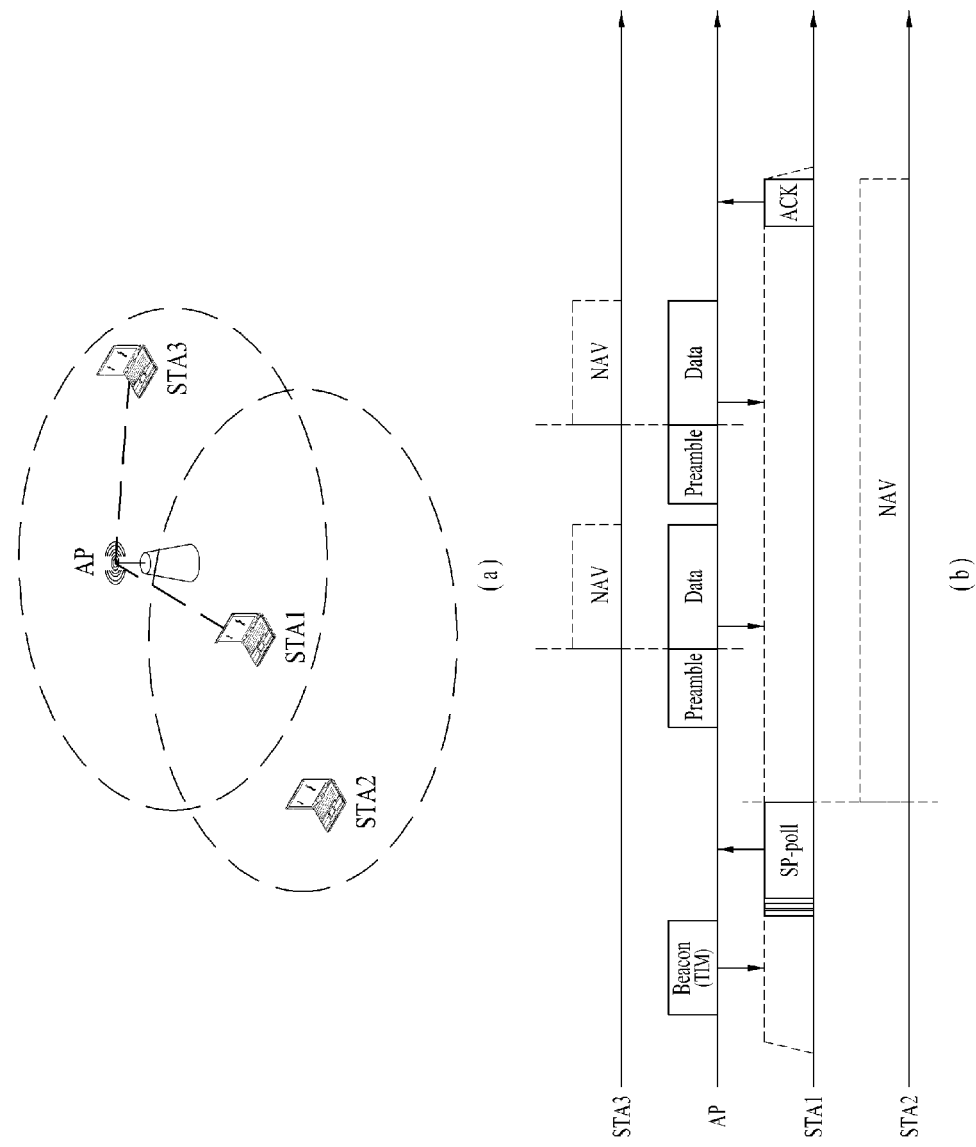
FIG. 31 is a diagram for explaining an NAV set by a different STA.

When an STA receives data from an AP for a polled service period, media access can be banned by configuring a NAV to prevent different STA from colliding with each other. FIG. 31 is a diagram for explaining an NAV set by a different STA.

As shown in an example of FIG. 31, assume that an STA 1 and an STA 3 are located within coverage of an AP and the AP and an STA 2 are located within coverage of the STA 1.

Referring to FIG. 31 (b), if the STA 1 has data to receive from the AP, the STA 1 transmits an SP-poll to the AP and the AP can transmit a data frame to the STA 1 for a polled service period. Since the STA 2 is located at the outside of the coverage of the AP, the STA 2 cannot receive a data frame from the AP. Yet, the STA 2 is located at the inside of the coverage of the STA 1, the STA 2 can receive a data frame from the STA 1. Hence, the STA 2 can overhear an SP-poll frame which is transmitted to the AP by the STA 1. Having overheard the SP-poll transmitted by the STA 1, the STA 2 recognizes duration of the polled service period via a duration field of the SP-poll frame, sets a NAV for the duration of the polled service period and may be then able to avoid collision with the STA 1.

Unlike the STA 2, since the STA 3 is located at the outside of the coverage of the STA 1, the STA 3 cannot overhear the SP-poll frame, which is transmitted to the AP by the STA 1. Yet, since the STA 3 is located at the inside of the coverage of the AP, the STA 3 can overhear a data frame transmitted to the STA 1 by the AP. Having overheard the data frame transmitted by the AP, the STA 3 sets a NAV during a period for which the data frame is transmitted using duration information of the data frame included in a preamble of the data frame to avoid a collision with the AP. In case that the AP continuously transmits data frames during the polled service period, the STA 3 sets a NAV to each of the continuous data frames to avoid a collision with the AP.

When a length of data to be transmitted by the AP is shorter than a polled service period set by an STA and data transmission ends earlier than the polled service period set by the STA, it is necessary to prevent the STA from unnecessarily holding a medium. To this end, when the polled service period ends earlier than expected, the STA can broadcast a CF-end frame to indicate that the polled service period ends. Regarding this, it shall be described with reference to FIG. 32 in the following.

Figure 32:
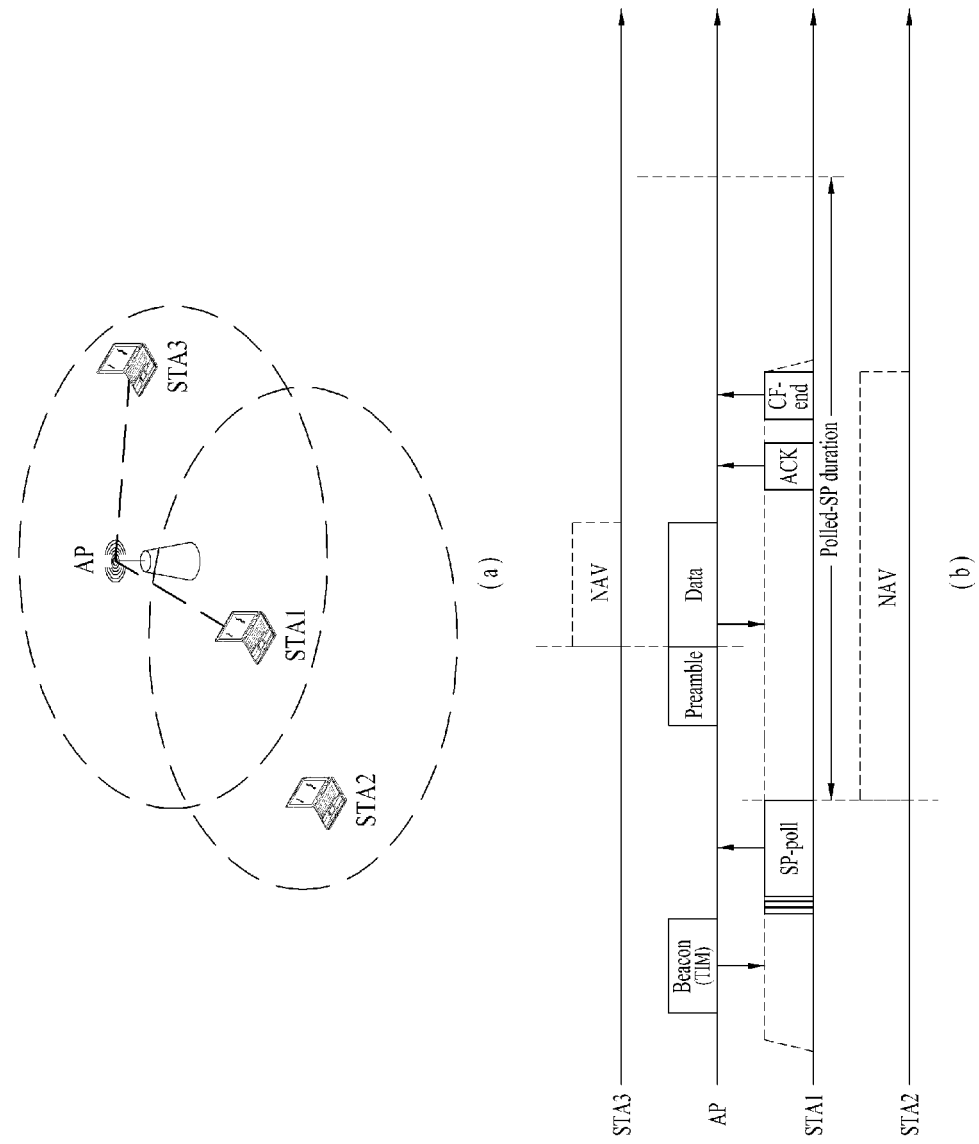
FIG. 32 is a diagram for explaining an example that an STA broadcasts a CF-end frame.

FIG. 32 is a diagram for explaining an example that an STA broadcasts a CF-end frame. As shown in an example of FIG. 32 (a), assume that an STA 1 and an STA 3 are located within coverage of an AP and the AP and an STA 2 are located within coverage of the STA 1.

Referring to FIG. 32 (b), if the STA 1 has data to receive from the AP, the STA 1 transmits an SP-poll to the AP and the AP can transmit a data frame to the STA 1 for a polled service period. The STA 2 overhears an SP-poll frame transmitted to the AP by the STA 1 and may be then able to set a NAV for a duration of the polled service period. The STA 3 overhears a data frame transmitted to the STA 1 by the AP and may be then able to set a NAV for a duration of the data frame.

In this case, when a length of the data frame transmitted to the STA 1 from the AP is shorter than the duration of the polled service period of the STA 1 and if it is O.K. to end the polled service period earlier than expected, the STA 1 broadcasts a CF-end frame to end the polled service period. Having heard the CF-end frame broadcasted by the STA 1, the STA 2 can change an end timing of the NAV, which is set in accordance with the duration of the initially polled service period, to a timing on which the CF-end frame ends. By doing so, the STA 2 cancels the NAV when the polled service period of the STA 1 ends at the same time and may be then able to attempt a media access.

Sharing Duration Information of Service Period

The aforementioned embodiments show an example that the AP recognizes a service period interval via a polled service period interval field included in an SP-poll frame received from the STA. According to a different embodiment of the present invention, the AP may inform the STA of polled service period interval information. Specifically, the AP may inform the STA of the polled service period interval information using an association response frame or a probe response frame.

To this end, the association response frame or the probe response frame may include a polled-SP interval element format or a response time element format.

Figure 33:
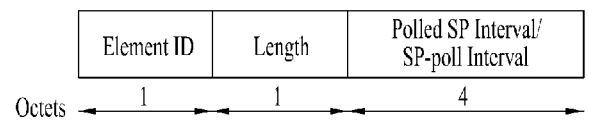
FIG. 33 is a diagram for an example of a polled service period interval element format.

FIG. 33 is a diagram for an example of a polled service period interval element format. As shown in an example of FIG. 33, the polled service period interval information format can include an element identifier (element ID) field, a length field, and a polled service period interval (polled-SP interval) field. The polled service period interval field can include interval information until a next polled service period starts after a polled service period ends.

The polled service period interval information format may include a service period polling interval (SP-polling interval) field together with or instead of the polled service period interval field. The service period polling interval field can include interval information between a transmission timing of a polled SP-poll frame and a transmission timing of a next SP-poll frame.

Having received the polled service period interval information or the service period polling interval information from the AP via the association response frame or the probe response frame, the STA can start a service period of the STA based on the received interval information.

Figure 34:
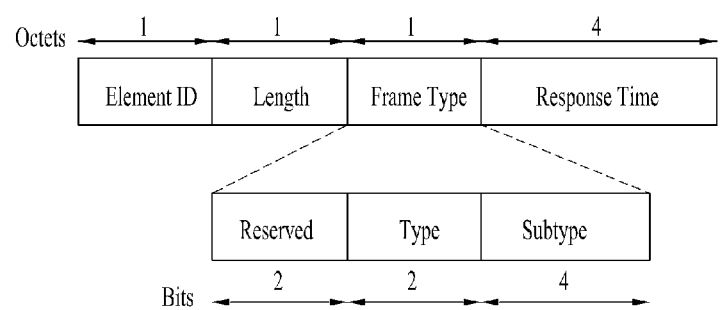
FIG. 34 is a diagram for an example of a response time element format.

FIG. 34 is a diagram for an example of a response time element format. As shown in an example of FIG. 34, the response time element format can include an element identifier (element ID) field, a length field, a frame type field and a response time field. The response time element format can be used to indicate expected response time of the AP in response to a response of the STA. The frame type field of the response time element format indicates a frame type to be transmitted by the AP in response to a request of the STA. The frame type field can include a type subfield and a subtype subfield. The type subfield of the frame type field indicates a type of a frame including management, control, data and the like and the subtype subfield indicates a subtype according to a type. The response field of the response time element format may include expected response time information to be transmitted by the AP in response to a request of the STA according to a frame type.

The AP can inform the STA of time information of a next polled service period using the response time element format. By doing so, the STA can obtain response time information on a PS-poll frame by a response time element in an association process with the AP. The STA can recognize a response time of a buffered data corresponding to a response of the AP for an SP-poll frame transmitted by the STA using the response time information obtained in the association process. The STA transmits the SP-poll frame using the response time of the AP for the SP-poll frame and can receive a data frame from the AP.

Scheduling of Service Period

An AP and an STA can schedule a service period of the STA in advance to transmit and receive data. The scheduling of the service period of the STA can make the AP recognize schedule information of the service period of the STA in advance and prepare data to be transmitted to the STA in advance. In order to schedule the service period of the STA, the AP and the STA need to share schedule information of service periods in advance. To this end, the AP may use duration information and interval information of a service period.

Figure 35:
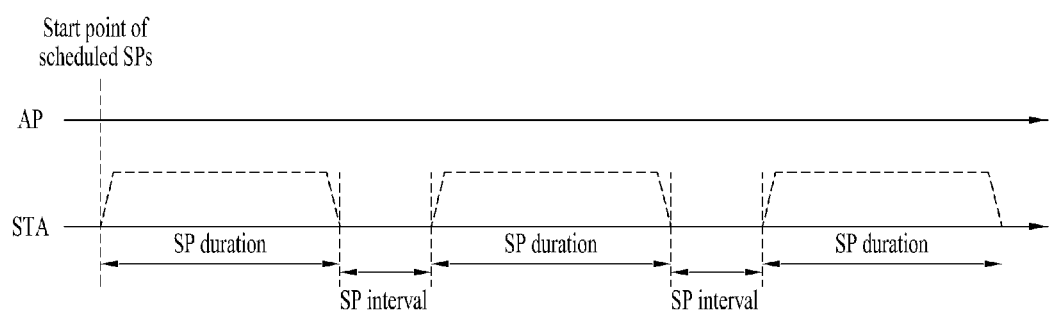
FIGS. 35 and 36 are diagrams for an example of duration information and interval information of a service period.
Figure 36:
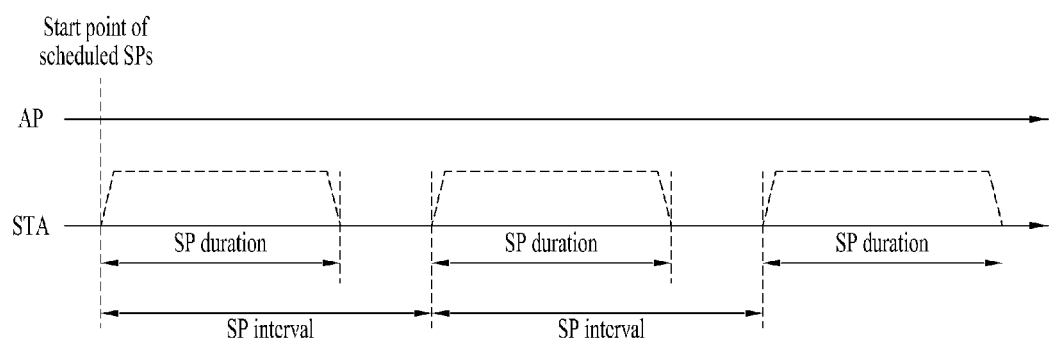

FIGS. 35 and 36 are diagrams for an example of duration information and interval information of a service period. In the example shown in FIGS. 35 and 36, a service period duration (SP duration) can be defined by a period from a start point of a scheduled service period to an end point of the scheduled service period. As shown in the example of FIG. 35, a service period interval may indicate interval between a timing on which a previous service period ends and a timing on which a next service period starts. Yet, as shown in the example of FIG. 36, the service period interval may indicate interval between a timing on which the previous service period starts and the timing on which the next service period starts.

Sharing Start Point of Scheduled Service Period

In order to use a scheduled service period (scheduled SP), it is necessary for an AP and an STA to share a start point of the scheduled service period with each other. The AP and the STA can share the start point of the scheduled service period with each other via a scheduled service period start request frame.

In this case, the AP can transmit the scheduled service period start request frame to the STA. On the contrary, the STA can transmit the scheduled service period start request frame to the AP. In case that the AP transmits the scheduled service period start request frame to the STA, the start request frame can be included in a beacon frame or a probe response frame, by which the present invention may be non-limited. On the contrary, in case that the STA transmits the scheduled service period start request frame to the AP, the start request frame can be included in a PS-poll frame or an SP-poll frame, by which the present invention may be non-limited. Having received the scheduled service period start request frame from a transmitter, a receiver can transmit a scheduled service period start response frame (e.g., included in ACK, NULL frame) in response to the scheduled service period start request frame.

Figure 37:
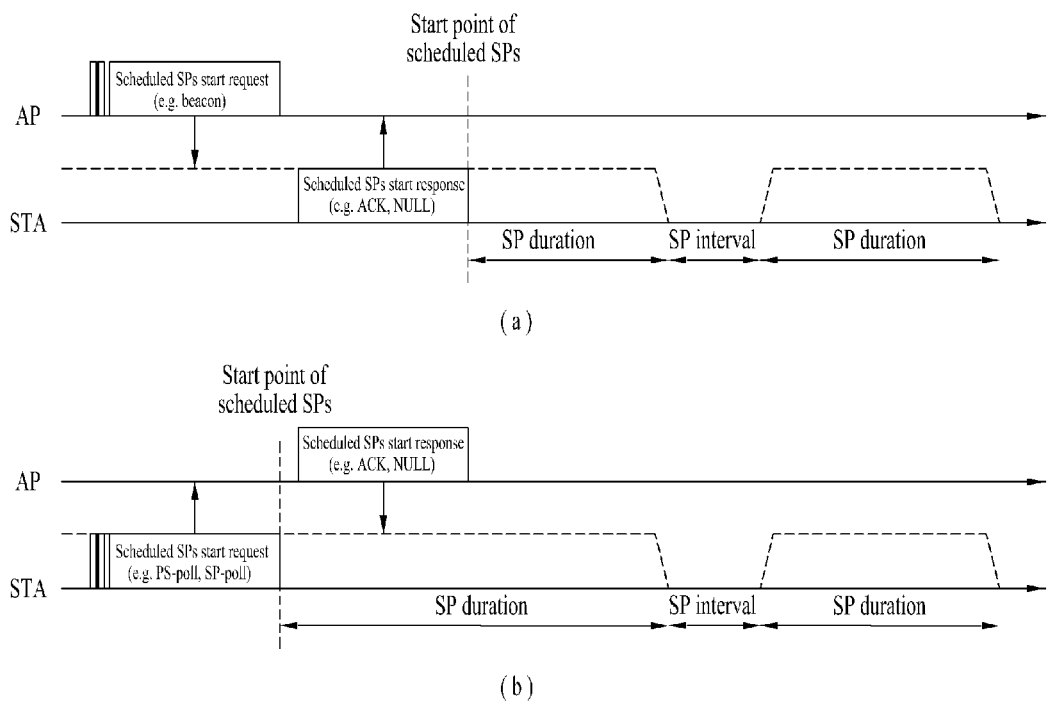
FIG. 37 is a diagram for explaining an example that a scheduled service period start request frame is transceived between an AP and an STA.

FIG. 37 is a diagram for explaining an example that a scheduled service period start request frame is transceived between an AP and an STA. As shown in the example of FIG. 37 (a), the AP can transmit the scheduled service period start request frame to the STA. Or, as shown in the example of FIG. 37 (b), the STA can transmit the scheduled service period start request frame to the AP.

The STA or the AP can transmit a scheduled service period start response frame in response to the scheduled service period start request frame.

The STA can set a service period on a start point of a scheduled service period indicated by the scheduled service period start request frame. In this case, in order to determine a duration of the service period and interval of the service period, schedule information including duration information and interval information of the service period can be included in the scheduled service period start request frame or the scheduled service period start response frame.

In case that the STA determines the duration and the interval of the service period, the STA can deliver schedule information to the AP via the scheduled service period start request frame or the scheduled service period start response frame transmitted to the AP. FIG. 37 (a) shows that the schedule information is delivered to the AP via the scheduled service period start response frame and FIG. 37 (b) shows that the schedule information is delivered to the AP via the scheduled service period start request frame.

On the contrary, in case that the AP determines the duration and the interval of the service period, the AP can deliver schedule information to the STA via the scheduled service period start request frame or the scheduled service period start response frame transmitted to the STA. FIG. 37 (a) shows that the schedule information is delivered to the STA via the scheduled service period start request frame and FIG. 37 (b) shows that the schedule information is delivered to the STA via the scheduled service period start response frame.

The duration information and the interval information of the service period can be defined by the duration field and the interval field of the scheduled service period start request frame, respectively. Or, the duration information and the interval information of the service period can be defined by the duration field and the interval field of the scheduled service period start response frame, respectively.

Although the aforementioned embodiment shows the example that the duration information and the interval information of the service period are transmitted via the scheduled service period start request frame or the scheduled service period start response frame, by which the present invention may be non-limited. As an example, in case that the AP determines the duration and the interval of the service period, the AP may also inform the STA of the duration and the interval of the service period using a scheduled service period element format.

Figure 38:
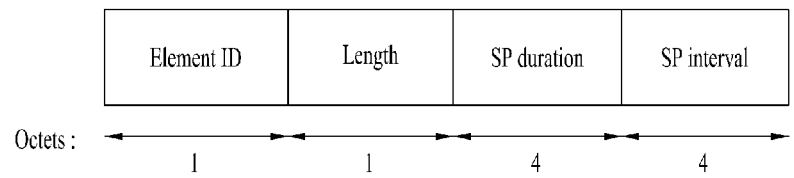
FIG. 38 is a diagram for explaining an example of a scheduled service period element format.

FIG. 38 is a diagram for explaining an example of a scheduled service period element format. As shown in an example of FIG. 38, the scheduled service period element format can include an element ID frame, a length frame, a service period duration frame and a service period interval field. The AP can inform the STA of service period duration information and service period interval information in a manner of transmitting a service period element format via an association response frame or a probe response frame.

Sharing End Point of Scheduled Service Period

A scheduled service period will naturally end when a service period duration elapses. Yet, if the service period is required to be ended before all of the service period duration elapses, it is necessary for the AP and the STA to share an end point of the service period with each other. A method for the AP to indicate the end point of the service period and a method for the STA to indicate the end point of the service period are described in detail with reference to the following drawings.

Figure 39:
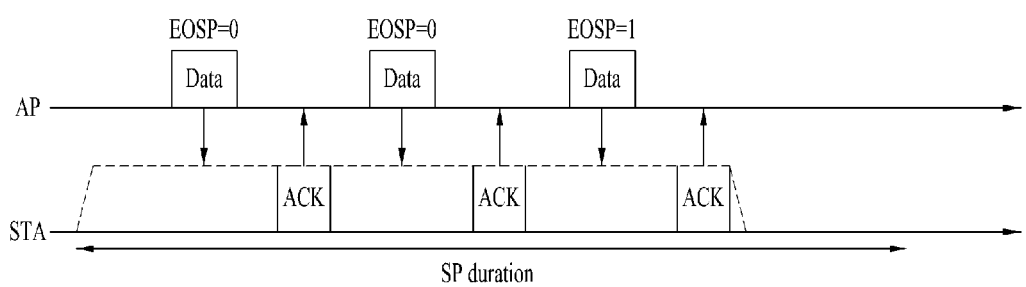
FIG. 39 is a diagram for explaining an example that an AP indicates an end of a service period.

FIG. 39 is a diagram for explaining an example that an AP indicates an end of a service period. An AP intending to end a service period can indicate the end of the service period in a manner of controlling a value of an EOSP (end of service period) field of a data frame transmitted to an STA. For instance, as shown in an example of FIG. 39, the AP intending to end the service period sets the EOSP field to '1' and can indicate the STA to end the service period after a data frame where the EOSP field is set to '1'.

Figure 40:
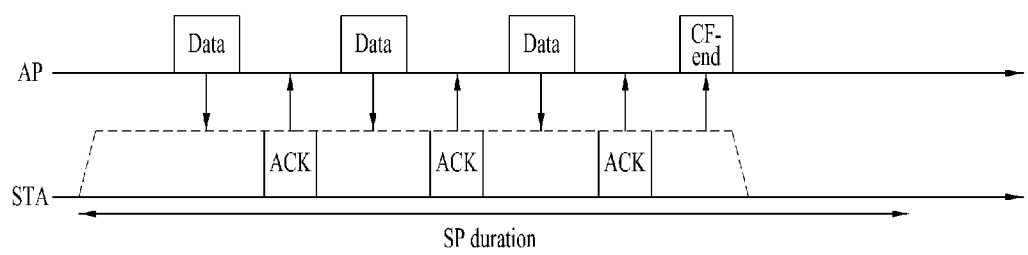
FIG. 40 is a diagram for explaining a different example that an AP indicates an end of a service period.

FIG. 40 is a diagram for explaining a different example that an AP indicates an end of a service period. An AP intending to end a service period can indicate the end of the service period in a manner of transmitting a CF-end frame to an STA. Although the CF-end frame can be transmitted to the STA in a unicast form, the CF-end end frame can be transmitted to the STA in a broadcast form.

Figure 41:
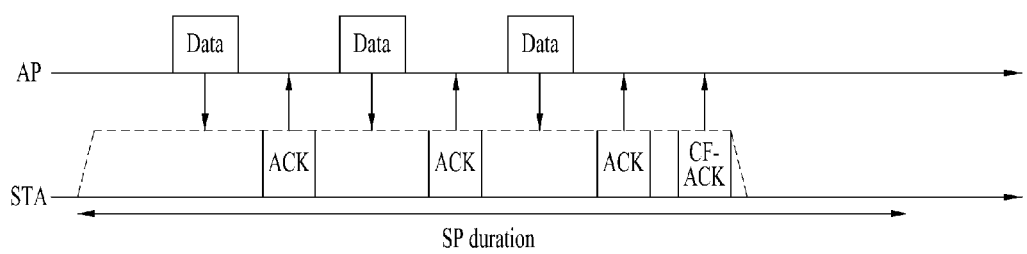
FIG. 41 is a diagram for explaining an example that an STA indicates an end of a service period.

FIG. 41 is a diagram for explaining an example that an STA indicates an end of a service period. An STA intending to end a service period can indicate the end of the service period in a manner of transmitting a CF-end frame to an AP. Although the CF-end frame can be transmitted to the AP in a unicast form, the CF-end end frame can be transmitted to the AP in a broadcast form.

Figure 42:
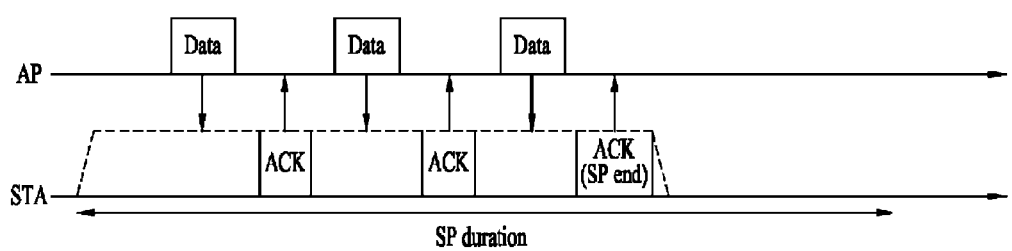
FIG. 42 is a diagram for explaining a different example that an STA indicates an end of a service period.

FIG. 42 is a diagram for explaining a different example that an STA indicates an end of a service period. An STA intending to end a service period can inform an AP of the end of the service period in a manner of indicating a service period end (SP end) to an ACK frame, which is transmitted on a timing when the service period is intended to be ended. To this end, the ACK frame can include a service period end field (SP end field) indicating the end of the service period.

Figure 43:
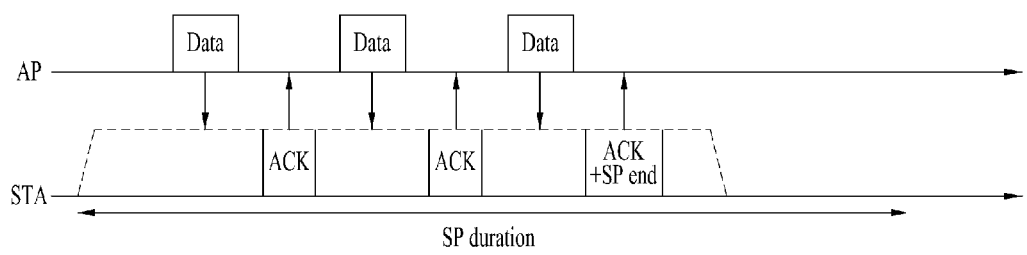
FIG. 43 is a diagram for explaining a further different example that an STA indicates an end of a service period.

FIG. 43 is a diagram for explaining a further different example that an STA indicates an end of a service period. An STA intending to end a service period may transmit an ACK and a service period end frame instead of an ACK frame, which is transmitted on a timing when the service period is intended to be ended. The ACK and the service period end frame simultaneously perform a role of the ACK frame and a function of informing an AP of the end of the corresponding SP.

In case that the AP or the STA intend to end all scheduled service periods, the AP or the STA can indicate a counterpart to end all service periods. A method for the AP to indicate the end of all service periods and a method for the STA to indicate the end of all scheduled periods are described in detail with reference to the following drawings.

Figure 44:
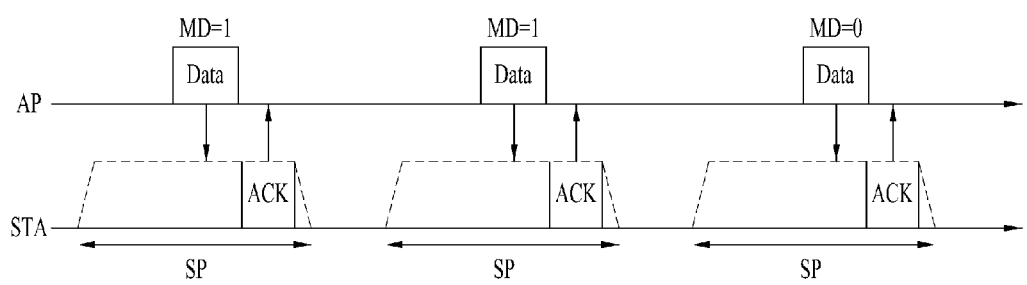
FIG. 44 is a diagram for explaining an example that an AP indicates an end of all scheduled service periods.

FIG. 44 is a diagram for explaining an example that an AP indicates an end of all scheduled service periods. The AP intending to end all scheduled service periods can indicate the end of all scheduled service periods in a manner of controlling a value of a more data (MD) field of a data frame transmitted to an STA. For instance, as shown in the example of FIG. 44, if the STA receives a data frame in which the MD field is set to '0', the STA recognizes that there is no more data to receive from the AP and may not generate a service period any more.

Figure 45:
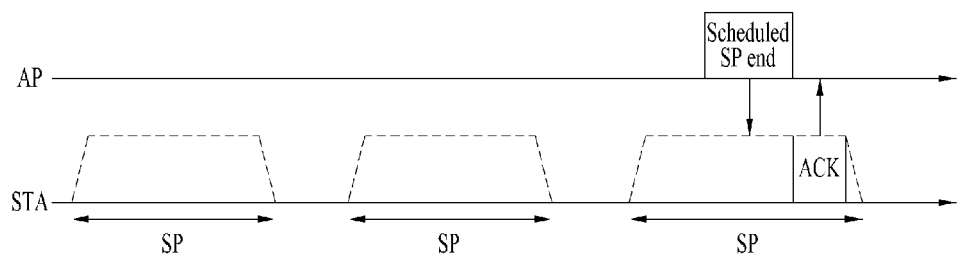
FIG. 45 is a diagram for explaining a different example that an AP indicates an end of all scheduled service periods.

FIG. 45 is a diagram for explaining a different example that an AP indicates an end of all scheduled service periods. The AP intending to end all scheduled service periods can transmit a scheduled service period end (scheduled SP end) frame to an STA. Having received the scheduled service period end frame, the STA transmits an ACK in response to the scheduled service period end frame and may not generate a service period any more.

Figure 46:
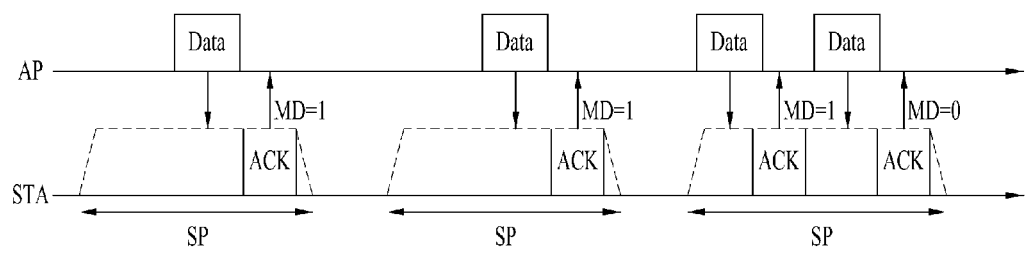
FIG. 46 is a diagram for explaining an example that an STA indicates an end of all scheduled service periods.

FIG. 46 is a diagram for explaining an example that an STA indicates an end of all scheduled service periods. An STA intending to end all scheduled service periods can inform an AP of the end of all scheduled service periods in a manner of controlling a value of a more data (MD) field of an ACK frame, which is transmitted on a timing when the all scheduled service periods are intended to be ended. For instance, as shown in the example of FIG. 46, if the STA transmits an ACK frame in which the MD field is set to '0', the AP recognizes that the all scheduled service periods to be ended and may not transmit data to the STA anymore.

Figure 47:
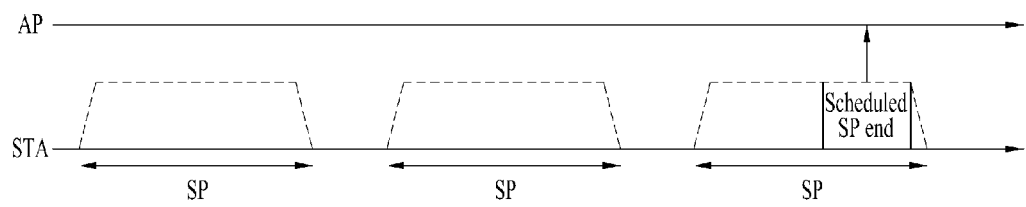
FIG. 47 is a diagram for explaining a different example that an STA indicates an end of all scheduled service periods.

FIG. 47 is a diagram for explaining a different example that an STA indicates an end of all scheduled service periods. An STA intending to end all scheduled service periods can transmit a scheduled service period end (scheduled SP end) frame to an AP. Having received the scheduled service end frame, the AP recognizes that the all scheduled service periods to be ended and may not transmit data to the STA anymore.

Sharing Start Point of all Scheduled Service Periods

Figure 48:
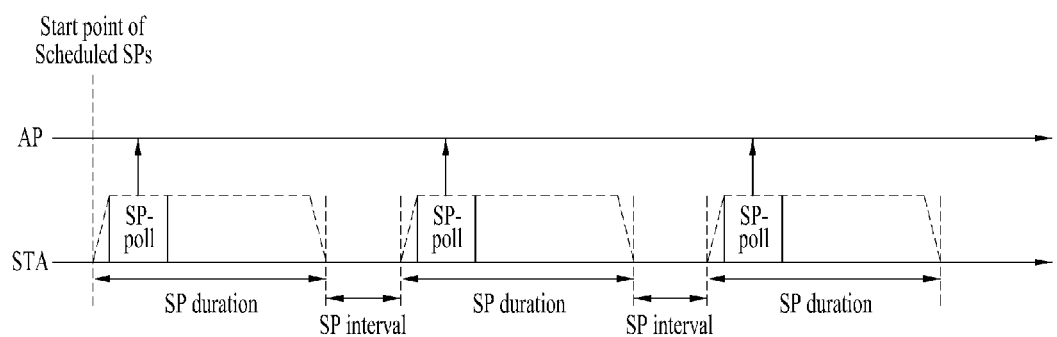
FIG. 48 is a diagram for explaining an example that a service period starts in a manner of transmitting an SP-poll frame to a start point of a scheduled schedule period.

If an STA and an AP are sharing start point information of all scheduled service periods with each other, the STA informs the AP of a start of a service period in a manner of transmitting an SP-poll to the AP on a start point of each scheduled service period and may be then able to ask the AP to transmit data. As an example, FIG. 48 is a diagram for explaining an example that a service period starts in a manner of transmitting an SP-poll frame to a start point of a scheduled schedule period. If an STA and an AP are sharing start point information of all scheduled service periods with each other, the STA informs the AP of a start of a service period in a manner of transmitting an SP-poll to the AP on a start point of each scheduled service period and may be then able to ask the AP to transmit data.

The start point information of all scheduled schedule period can be shared with each other between the STA and the AP via the aforementioned scheduled service period start request frame or the scheduled service period start response frame. And, duration information of the scheduled period and interval information of the scheduled period can also be shared with each other between the STA and the AP via a start request frame of a scheduled service period, a start request frame of a service period or a scheduled service period element format mentioned earlier with reference to FIG. 38.

As mentioned earlier with reference to FIG. 39 and FIG. 40, an end point of each of scheduled service periods can be indicated using an EOSP field of a data frame transmitted by the AP or a CF-end frame. Or, as mentioned earlier with reference to FIG. 41 and FIG. 42, the end point of each of the scheduled service periods can be indicated via a CF-end frame transmitted by the STA, an ACK frame, an ACK or a service period end frame.

When the AP or the STA intends to end all scheduled service periods, the AP or the STA can indicate the counterpart to end all of the scheduled service periods. A method for the AP to indicate an end of all scheduled service periods and a method for the STA to indicate an end of all scheduled service periods are described in detail with reference to drawings in the following.

Figure 49:
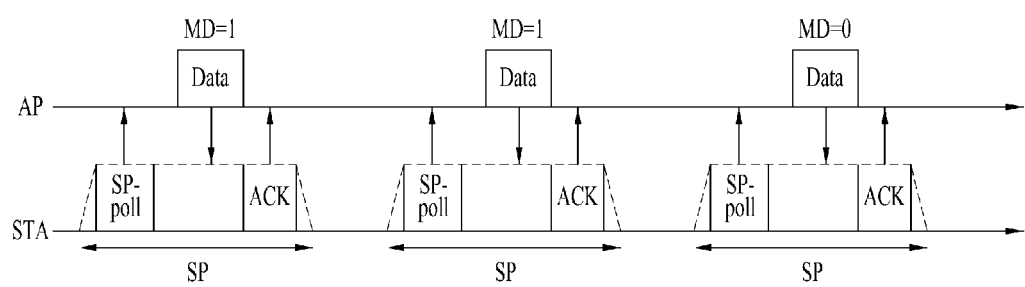
FIG. 49 is a diagram for explaining an example that an AP indicates an end of all scheduled service periods.

FIG. 49 is a diagram for explaining an example that an AP indicates an end of all scheduled service periods. If a scheduled service period starts by an SP-poll frame, an AP can transmit data to an STA during a polled service period. In this case, the AP intending to end all scheduled service periods can indicate the all scheduled service periods to be ended in a manner of controlling a value of a more data (MD) field of a data frame transmitted to the STA. For instance, as shown in an example of FIG. 49, if the STA receives a data frame in which the MD field is set to '1', the STA recognizes that there exist data to receive from the AP and can consistently transmit a SP-poll frame to activate a scheduled service period. On the contrary, if the STA receives a data frame in which the MD field is set to '0', the STA recognizes that there is no data to receive from the AP anymore and may not generate a service period anymore. In particular, having received the data frame in which the MD field is set to '0', the STA stops transmitting the SP-poll frame to make a scheduled service period not to be activated anymore.

Figure 50:
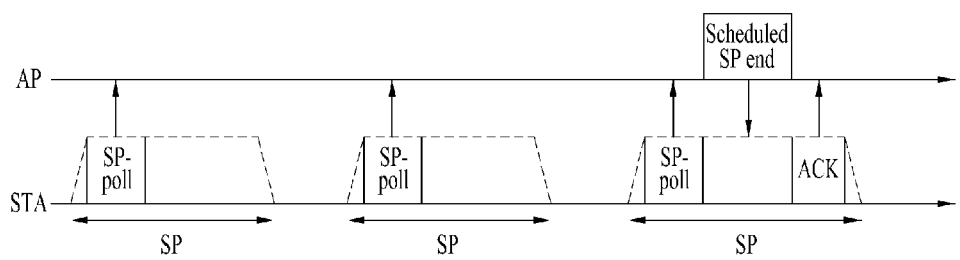
FIG. 50 is a diagram for explaining a different example that an AP indicates an end of all scheduled service periods.

FIG. 50 is a diagram for explaining a different example that an AP indicates an end of all scheduled service periods. An AP intending to end all scheduled service periods can transmit a scheduled service period end (scheduled SP end) frame to an STA. Having received the scheduled SP end frame, the STA stops transmitting an SP-poll frame to make a scheduled service period not to be activated anymore.

Figure 51:
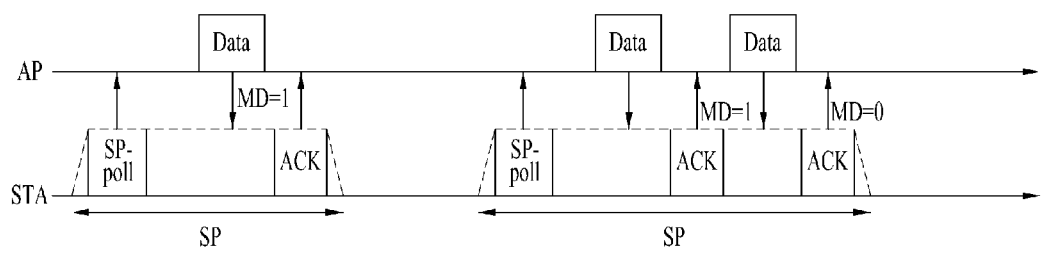
FIG. 51 is a diagram for explaining an example that an STA indicates an end of all scheduled service periods.

FIG. 51 is a diagram for explaining an example that an STA indicates an end of all scheduled service periods. The STA intending to end all scheduled service periods can inform an AP that the all scheduled service periods to be ended in a manner of controlling a value of a more data (MD) field of an ACK frame, which is transmitted on a time that the all scheduled service periods are intended to be ended. For instance, as shown in an example of FIG. 51, the STA transmits an ACK frame in which the MD field is set to 0 to an AP. Having received the ACK frame, the AP recognizes that all scheduled service periods to be ended and may not transmit data to the STA anymore. After the ACK frame in which the MD field is set to 0 is transmitted, the STA stops transmitting an SP-poll frame to make a scheduled service period not to be activated anymore.

Figure 52:
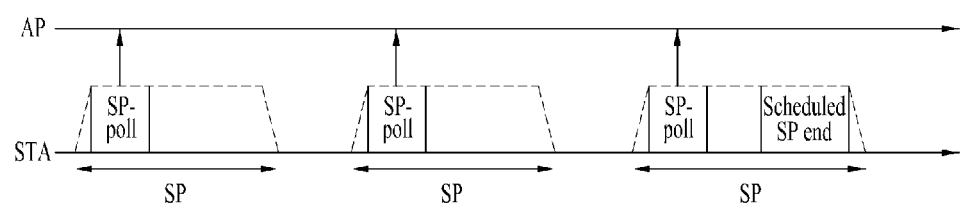
FIG. 52 is a diagram for explaining a different example that an STA indicates an end of all scheduled service periods.

FIG. 52 is a diagram for explaining a different example that an STA indicates an end of all scheduled service periods. The STA intending to end all scheduled service periods can transmit a scheduled service period end (scheduled SP end) frame to an AP. Having received the scheduled SP end frame, the AP recognizes that all scheduled service periods to be ended and may not transmit data to the STA anymore. After the scheduled SP end frame is transmitted, the STA stops transmitting an SP-poll frame to make a scheduled service period not to be activated anymore.

Figure 53:
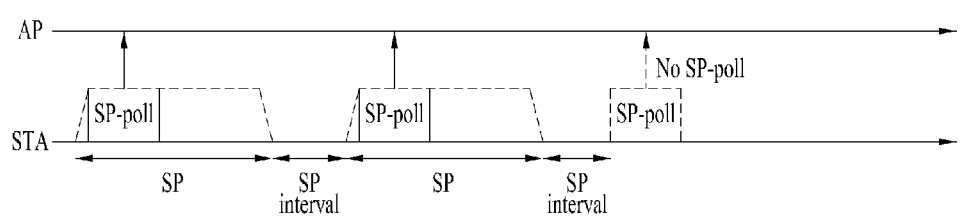
FIG. 53 is a diagram for explaining a further different example that an STA indicates an end of all scheduled service periods.

FIG. 53 is a diagram for explaining a further different example that an STA indicates an end of all scheduled service periods. The STA transmits an SP-poll frame on a start point of each of scheduled service periods to inform a start of a schedule period. The STA, which intends to end the scheduled period instead of activating the scheduled period, simply stops transmitting an SP-poll frame on a time that the scheduled service period is intended to be ended to make a scheduled service period not to be activated anymore. If an AP does not receive an SP-poll frame within a determined duration from a time on which the SP-poll is supposed to be transmitted, the AP can determine it as the STA are intending to end a scheduled service period.

Figure 54:
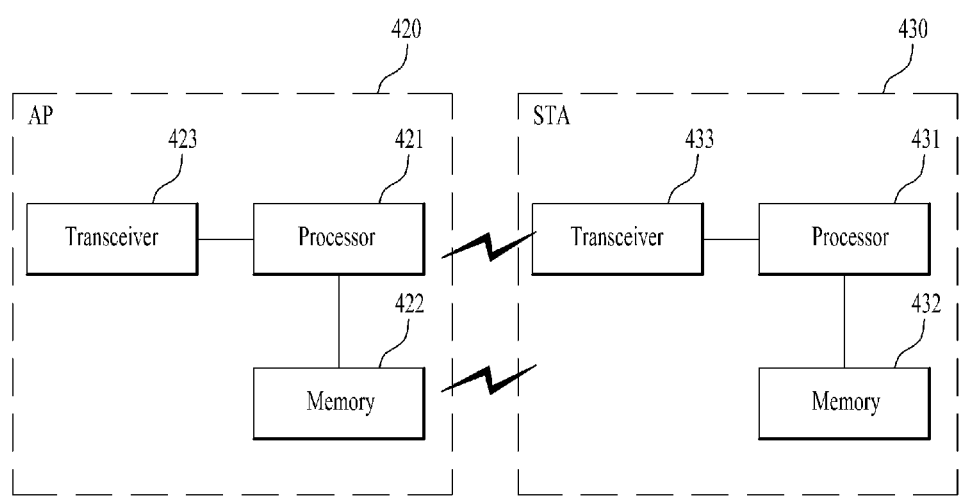
FIG. 54 is a block diagram of an example of a wireless device according to one embodiment of the present invention.

FIG. 54 is a block diagram of an example of a wireless device according to one embodiment of the present invention.

Referring to FIG. 54, an AP 420 includes a processor 421, a memory 422 and a transceiver 423. The processor 421 implements a proposed function, a process and/or a method. Layers (refer to FIG. 5) of a wireless interface protocol can be implemented by the processor 421. The memory 422 is connected with the processor 421 and stores various informations to drive the processor 421. The transceiver 423 is connected with the processor 421 and transmits and/or receives a radio signal.

An STA 430 includes a processor 431, a memory 432 and a transceiver 433. The processor 431 implements a proposed function, a process and/or a method. Layers (refer to FIG. 5) of a wireless interface protocol can be implemented by the processor 431. The memory 432 is connected with the processor 431 and stores various informations to drive the processor 431. The transceiver 433 is connected with the processor 431 and transmits and/or receives a radio signal.

The memory 422/432 can be installed in the inside or outside of the processor 421/431 and can be connected with the processor 421/431 with a well-known means. And, the AP 420 and/or the STA 430 can include a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although various embodiments according to the present invention are explained centering on an example applied to IEEE 802.11 system, the present invention can be identically applied to various wireless access systems as well as IEEE 802.11 system.

What is claimed is:

1. A method of setting an SP (service period) of an STA (station) in a wireless communication system, comprising the steps of:
   receiving a beacon from an access point (AP), the beacon comprising a traffic indication map (TIM) element which indicates the AP has data to be received by the STA;
   transmitting a trigger frame to the AP; and
   starting the service period to receive data from the AP,
   wherein the trigger frame comprises a frame body field which includes a service period field information element (IE) and information related to automatic power saving delivery (APSD) downlink delivery, the service period field IE indicating a length of a service period, wherein the information related to the APSD downlink delivery comprises downlink data size limitation information of the APSD and an access category field indicating access categories capable of being delivered or triggered by the STA, wherein the access category field consists of data bits as many as the number of the access categories, and wherein each of the bits indicates whether a corresponding access category is possible to be delivered or triggered by the STA or not.

2. The method of claim 1, wherein the trigger frame is either a data frame containing data to be transmitted to the AP or a null frame triggering data transmission of the AP, and the trigger frame comprises a frame type field and wherein the frame type field indicates whether the trigger frame is the data frame or the null frame.

3. The method of claim 2, wherein the access categories comprise a background category, a best effort category, a video category and a voice category.

4. The method of claim 1, wherein the service period field determines the maximum number of data units to be received from the AP at the STA during the service period.

5. The method of claim 4, wherein the data units correspond to at least one selected from the group consisting of a MSDUs (MAC service data unit), an A-MSDUs (Aggregate-MSDU) and a MMPDUs (MAC management protocol data unit).

6. The method of claim 4, wherein the service period ends when the maximum number of the data units are received by the STA.

7. An STA (station) device setting an SP (service period) in a wireless communication system, comprising:

a transceiver configured to transceive a radio signal with an AP (access point); and a processor configured to control the transceiver to, receive a beacon from an access point (AP), the beacon comprising a traffic indication map (TIM) element which indicates the AP has data to be received by the STA; and transmit a trigger frame to the AP to start the service period, wherein the trigger frame comprises a frame body field which includes a service period field information element (IE) and information related to automatic power saving delivery (APSD) downlink delivery, the service period field IE indicating a length of a service period, wherein the information related to the APSD downlink delivery comprises downlink data size limitation information of the APSD and an access category field indicating access categories capable of being delivered or triggered by the STA, wherein the access category field consists of data bits as many as the number of the access categories, and wherein each of the bits indicates whether a corresponding access category is possible to be delivered or triggered by the STA or not.

* * * * *